(12) United States Patent
Goto et al.

(10) Patent No.: US 7,475,906 B2
(45) Date of Patent: Jan. 13, 2009

(54) AIRBAG APPARATUS

(75) Inventors: Yoshiaki Goto, Aichi-ken (JP); Kazuaki Bito, Aichi-ken (JP); Naohiko Ishiguro, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/149,195

(22) Filed: Apr. 29, 2008

(65) Prior Publication Data
US 2008/0284147 A1 Nov. 20, 2008

(30) Foreign Application Priority Data
May 15, 2007 (JP) ............................. 2007-129872

(51) Int. Cl.
*B60R 21/16* (2006.01)
(52) U.S. Cl. .................. 280/743.2; 280/738; 280/743.1
(58) Field of Classification Search ................. 280/731, 280/732, 736, 738, 743.1, 743.2
See application file for complete search history.

(56) References Cited

U.S. PATENT DOCUMENTS

| 5,219,179 A * | 6/1993 | Eyrainer et al. ............. 280/739 |
| 5,603,526 A * | 2/1997 | Buchanan ................... 280/739 |
| 6,290,257 B1 * | 9/2001 | Bunce et al. ................. 280/739 |
| 6,648,371 B2 * | 11/2003 | Vendely et al. ............. 280/739 |
| 7,237,802 B2 * | 7/2007 | Rose et al. ............... 280/743.1 |
| 2006/0151975 A1 * | 7/2006 | Yamaji et al. ............. 280/728.2 |
| 2007/0145729 A1 * | 6/2007 | Ishiguro et al. ............. 280/739 |
| 2008/0007038 A1 * | 1/2008 | Fischer et al. ............ 280/743.2 |
| 2008/0023950 A1 * | 1/2008 | Kalczynski et al. ......... 280/739 |
| 2008/0042416 A1 * | 2/2008 | Razazi et al. ............ 280/743.2 |
| 2008/0073892 A1 * | 3/2008 | Rose et al. ................... 280/739 |

FOREIGN PATENT DOCUMENTS

JP 2000-043672 2/2000

* cited by examiner

*Primary Examiner*—Toan C To
(74) *Attorney, Agent, or Firm*—Posz Law Group, PLC

(57) ABSTRACT

The airbag apparatus includes an airbag provided with a flap element for opening and closing an exhaust hole. The flap element includes a flap and an adjusting belt. The leading end region of the adjusting belt is sewn to the flap by a generally straight sewn seam and acts as a joint portion to the flap. The root region of the adjusting belt is joined to an open/close mechanism. A first terminal of the sewn seam disposed proximate a root region of the joint portion is located farther away from the open/close mechanism relative to a second terminal disposed proximate a leading end of the joint portion. The sewn seam is configured rupturable from the first terminal when the airbag inflates with the adjusting belt engaged with the open/close mechanism to separate the joint portion of the adjusting belt from the flap body so the flap uncovers the exhaust hole.

9 Claims, 23 Drawing Sheets

AIRBAG APPARATUS

The present application claims priority from Japanese Patent Application No. 2007-129872 of Goto et al., filed on May 15, 2007, the disclosure of which is hereby incorporated into the present application by reference.

BACKGROUND OF THE INVENTION

1. Field of the Invention

The present invention relates to an airbag apparatus including an airbag whose internal pressure upon inflation is controllable.

2. Description of Related Art

An airbag apparatus is known from JP2000-43672: the apparatus has an airbag provided with an exhaust hole for discharging part of inflation gas and a flap element for openably closing off the exhaust hole. The flap element is joined to an open/close mechanism that controls opening and closing of the exhaust hole in accordance with the seating position and physical size of an occupant such that the internal pressure of the airbag is controlled upon inflation.

In the above airbag apparatus, the flap element is formed of a flexible sheet-shaped member sized to close off the exhaust hole and is sewn to a periphery of the exhaust hole by a generally annular sewn seam by sewing thread formed all around the exhaust hole. The flap element is adapted to keep closing the exhaust hole when the airbag inflates with the flap member released from the open/close mechanism. When the airbag inflates with the flap member engaged by the open/close mechanism, the flap element is subjected to movement restriction by the open/close mechanism and is removed from the periphery of the exhaust hole by tearing out of the sewing thread of the sewn seam and thereby opening up the exhaust hole.

However, in the conventional art, the sewn seam that sews up the flap element to the periphery of the exhaust hole is formed into a generally annular contour. In other words, the sewn seam has a wide configuration that is generally orthogonal to the working direction of a tension applied to the sewn seam when subjected to the movement restriction by the open-close mechanism. Since the tension works on the wide sewn seam at one time, the sewing thread sometimes fails to tear out smoothly, so that the flap member is not removed quickly to uncover the exhaust hole.

SUMMARY OF THE INVENTION

The present invention contemplates to solve the above-mentioned problems, and therefore, has an object to provide an airbag apparatus capable of opening up the exhaust hole quickly.

The airbag apparatus of the invention includes an airbag inflatable with inflation gas from a folded and housed state and provided with an exhaust hole for releasing part of inflation gas, an open/close mechanism that controls opening and closing of the exhaust hole, and a flap element joined to a periphery of the exhaust hole of the airbag and connected with the open/close mechanism for openably closing the exhaust hole. The flap element is foldable together with the airbag.

The flap element includes a flap that is configured of flexible sheet material and joined to the periphery of the exhaust hole for openably closing off the exhaust hole, and a flexible adjusting belt releasably joined to the open/close mechanism at a root region thereof and sewn to the flap in an overlapping fashion by a sewn seam at a leading end region thereof that acts as a joint portion to the flap.

The sewn seam extends generally straightly from a root end toward a leading end of the joint portion and is configured such that a first terminal of the sewn seam disposed on the part of the root end of the joint portion is located farther away from the open/close mechanism relative to a second terminal disposed on the part of the leading end of the joint portion upon airbag inflation. The sewn seam is configured to keep joining the joint portion of the adjusting belt and the flap such that the exhaust hole remains closed when the airbag inflates with the adjusting belt released from the open/close mechanism and is configured to tear out from the first terminal by breakage of sewing thread to separate the joint portion from the flap and allow the flap to uncover the exhaust hole when the airbag inflates with the adjusting belt engaged with the open/close mechanism.

When the airbag of the airbag apparatus of the invention inflates with the adjusting belt engaged with the open/close mechanism, the flap connected to the periphery of the exhaust hole of the airbag moves away from the open/close mechanism along with airbag deployment. At this time, since the length of the area of the adjusting belt between the open/close mechanism and joint portion is constant, the flap pulls the adjusting belt in such a manner as to stretch the area between the open/close mechanism and joint portion straightly while moving away from the open/close mechanism, and further pulls the joint portion away from the open/close mechanism. Then sewing thread of the sewn seam that joins the joint portion to the flap ruptures and the joint portion is separated from the flap, so that the flap further moves away from the open/close mechanism and rides up to open up the exhaust hole.

Since the sewn seam that sews the joint portion of the adjusting belt to the flap is generally straight from the root end toward the leading end of the joint portion and formed such that the first terminal disposed on the part of the root end of the joint portion is located farther away from the open/close mechanism relative to the second terminal disposed on the part of the leading end of the joint portion upon airbag inflation, when pulled by the flap, a stress concentrates on the first terminal and causes tearing out of the sewing thread of the sewn seam stitch by stitch from the first terminal to the second terminal. Therefore, the threads of the seam rupture smoothly and swiftly such that the joint portion is separated from the flap quickly. Hence the flap body is pushed by the inflation gas and opens up to uncover the exhaust hole.

Therefore, the airbag apparatus of the invention is capable of opening up the exhaust hole quickly.

If the above flap element includes a plurality of the flaps and the flaps are superimposed one on another on a location to close off the exhaust hole and sewn together with the joint portion of the adjusting belt by the sewn seam, leading end regions of the flaps will be prevented from riding up due to the inflation gas when the airbag inflates in such condition that the adjusting belt is released from the open/close mechanism, thereby inhibiting gas leakage from the exhaust hole. Of course, when the airbag inflates with the adjusting belt engaged with the open/close mechanism, the sewing thread of the sewn seam tears out to separate the flaps from the joint portion of the adjusting belt, so that the flaps smoothly open to expose the exhaust hole.

If the joint portion of the adjusting belt is further arranged to overlap with an opening area of the exhaust hole, all the flaps are sewn together with the joint portion by the sewn seam that is arranged to overlap with an opening area of the exhaust hole. In other words, the sewn seam sews all the flaps together in the vicinity of the center of the exhaust hole, and therefore, prevents the flaps from deviating from one another when the airbag inflates with the adjusting belt released from the open/close mechanism, even if they are pushed by the inflation gas. This means that gas leakage from the closed exhaust hole is prevented if the flaps are configured to close off the exhaust hole as a whole, and accordingly, it is not necessary to make all the flaps large enough to close off the whole exhaust hole. Hence each of the flaps may be so sized as to cover only an area from the joint of the flap to the periphery of the exhaust hole to the sewn seam. With this configuration less base material is required for the flaps in comparison with an instance of using more than one such flap as is large enough to close off the whole exhaust hole.

Moreover, if the joint portion of the adjusting belt is arranged to extend generally along a direction to which the adjusting belt is pulled by the flap when the airbag inflates with the adjusting belt engaged with the open/close mechanism, the traction force of the flap easily concentrates on the first terminal and sewing thread of the sewn seam rupture swiftly.

If the sewn seam additionally sews the joint portion of the adjusting belt to the periphery of the exhaust hole as well as to the flap at the vicinities of the first terminal and second terminal, the flaps are sewn to the periphery of the exhaust hole not only by a joint that joins the flaps to the periphery of the exhaust hole but also by the sewn seam. This arrangement further inhibits leakage of inflation gas from the exhaust hole when the airbag inflates with the adjusting belt released from the open/close mechanism.

Further additionally, if the flaps are joined to the periphery of the exhaust hole in radial arrangement about the center of the exhaust hole, each of the flaps opens smoothly without being affected by other flaps.

The exhaust hole of the airbag may be comprised of a slit having such a linear shape as to project at the center so that one of the flaps is comprised of a region of a base cloth of the airbag surrounded by the slit. With this configuration, less base material is required for manufacturing the flaps compared with an instance where all the flaps are separately formed from the airbag.

The flap element may be located inside the airbag. With this configuration, since the flap closes off the exhaust hole from inside of the airbag, gas leakage from the exhaust hole when closed by the flap is inhibited in comparison with the instance where the flap element is located on the outside of the airbag. Nevertheless, the flap element may be located on the outside of the airbag. In this case, the flap opens smoothly when pushed by inflation gas in comparison with the instance where the flap element is located inside the airbag since it closes off the exhaust hole from outside of the airbag.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims. For example, although the following embodiments will be described as applied to an airbag apparatus for a front passenger's seat disposed in front of a front passenger seat, the invention should not be limited thereby, but is applicable to an airbag apparatus for a steering wheel.

Figure 1:
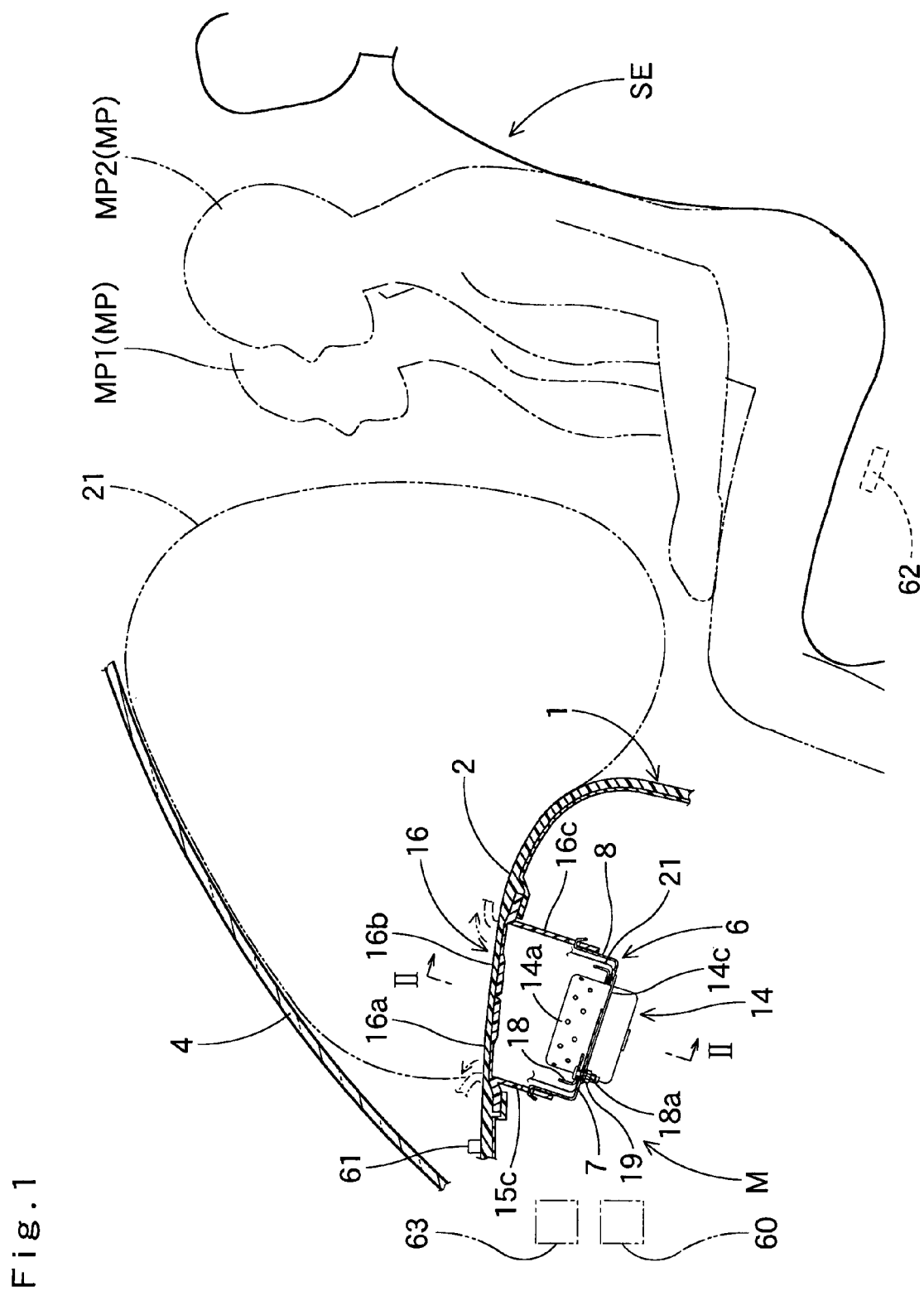
FIG. 1 illustrates an instrument panel equipped with an airbag apparatus embodying the invention and a passenger from a side.
Figure 2:
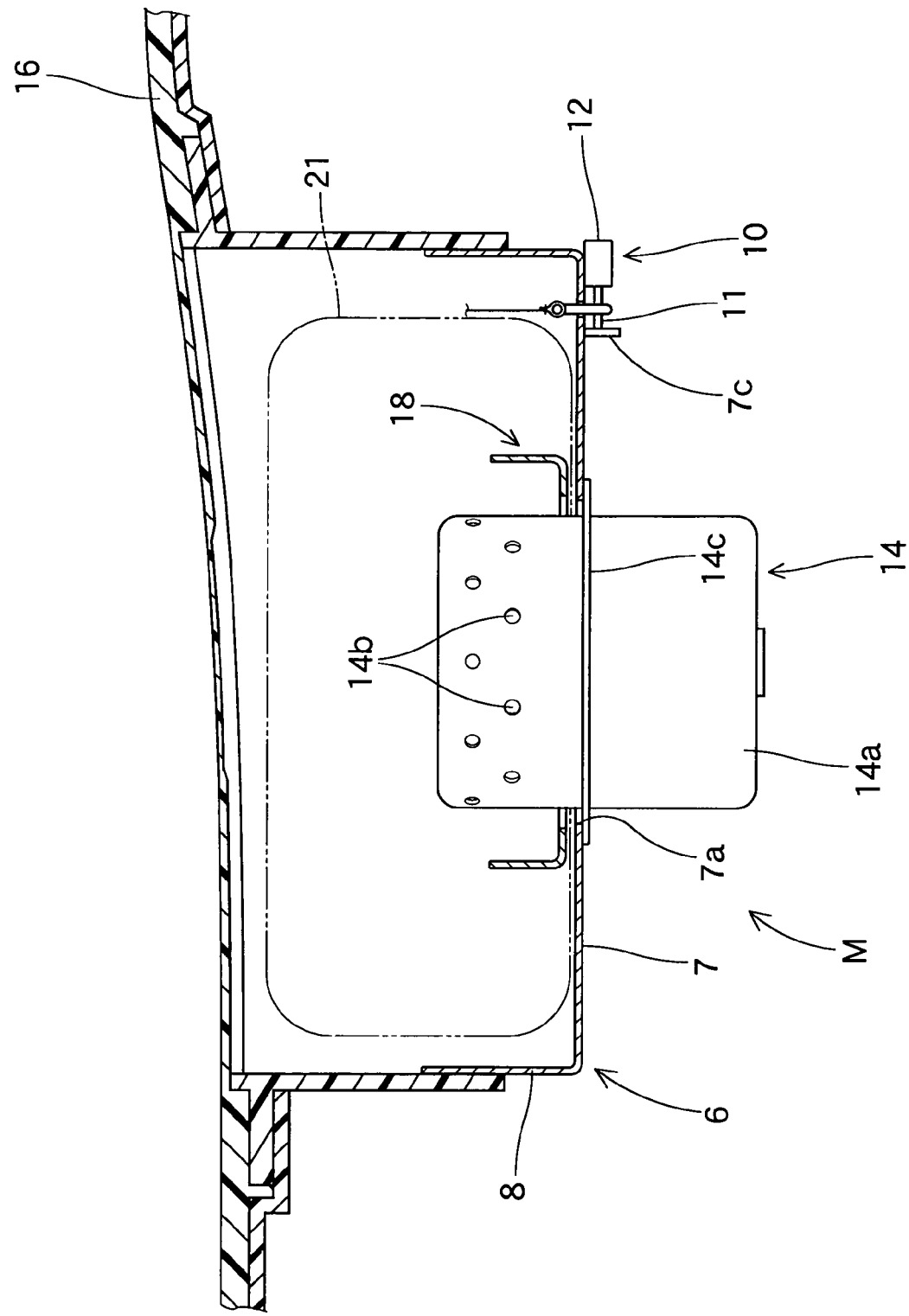
FIG. 2 is a sectional view of the airbag apparatus taken along line II-II of FIG. 1.

As shown in FIG. 1, an airbag apparatus M for a front passenger's seat embodying the present invention is a top mount type that is mounted in an interior of a top plane 2 of an instrument panel or dashboard 1. As shown in FIGS. 1 and 2, the airbag apparatus M includes a folded-up airbag 21, an inflator 14 for supplying the airbag 21 with inflation gas, a case 6 for housing and holding the airbag 21 and inflator 14, a retainer 18 that attaches the airbag 21 and inflator 14 to the case 6, an airbag cover 16 for covering the airbag 21, an anchor mechanism 10 serving as open/close mechanism that controls opening and closing operations of a later-described exhaust hole 27 of the airbag 21, and a flap element 45 joined to the periphery of the exhaust hole 27. The inflator 14 and anchor mechanism 10 are controlled by a control device 60.

Unless otherwise specified, up/down, front/rear, and left/right directions in this specification are intended to refer to up/down, front/rear, and left/right directions of a vehicle being steered straight ahead. With respect to the airbag 21, up/down, front/rear, and left/right directions are intended to refer to up/down, front/rear, and left/right directions in a fully inflated of the airbag mounted on a vehicle.

As shown in FIG. 1, the control device 60 is electrically communicated with a position sensor 61, which is a kind of occupant sensor, for measuring physical size of an occupant MP seated in a seat SE and a clearance between the dashboard 1 and occupant MP, a weight sensor 62 which is also a kind of occupant sensor for measuring weight of the occupant MP, and a collision sensor 63 for detecting acceleration of vehicle and direction of acceleration, and so on. In response to electric signals from these sensors, the control device 60 activates the inflator 14 and controls the operation of the anchor mechanism 10 so the airbag 21 inflates adequately according to the circumstances.

Referring to FIG. 1, the airbag cover 16 is integral with the dashboard 1 that is made from synthetic resin, and includes two doors, i.e. front and rear doors 16a and 16b that are adapted to open when pushed by the airbag 21 upon airbag deployment. Around the doors 16a and 16b is a joint wall 16c by which the airbag cover 16 is coupled to the case 6.

The inflator 14 includes a generally columnar body 14a provided with gas discharge ports 14b and a flange 14c projecting from the outer circumference of the body 14a and having a generally square plate shape.

The case 6 is made of sheet metal and has a generally rectangular parallelepiped shape with a rectangular opening on the top. The case 6 includes a bottom wall 7 having a generally rectangular plate shape and a circumferential wall 8 extending upward from the outer peripheral edge of the bottom wall 7 for engagement with the joint wall 16c of the airbag cover 16. The case 6 is further provided with unillustrated brackets, on the bottom wall 7, to be connected to the vehicle body structure. The bottom wall 7 includes an insert hole 7a for receiving the inflator 14 from below and a slot 7b for receiving a later-described loop 58 formed at a root portion 52b of an adjusting belt 52 of the flap element 45, proximate and on the left of the insert hole 7a (FIG. 3).

Figure 3:
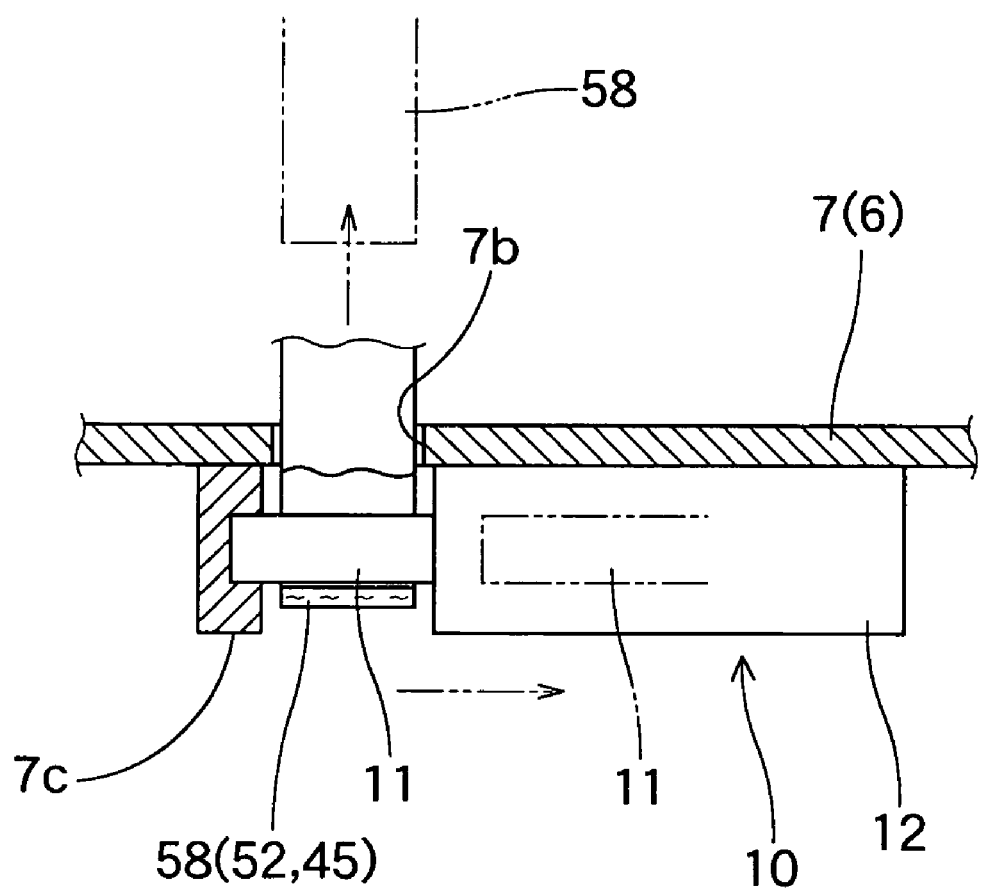
FIG. 3 is a partial enlarged section of an anchor mechanism used in the airbag apparatus.

As shown in FIGS. 2 and 3, the bottom wall 7 is provided on its underside and proximate the slot 7b with the anchor mechanism or open/close mechanism 10 for anchoring the root portion 52b of the adjusting belt 52 of the flap element 45. The anchor mechanism 10 includes an anchor pin 11 to be put through the loop 58 formed at the root portion 52b of the adjusting belt 52 and an actuator 12 secured to the underside of the bottom wall 7 for retracting the pin 11. If the actuator 12 retracts the anchor pin 11, the pin 11 stops retaining the loop 58 as indicated by double-dashed lines in FIG. 3. The actuator 12 can be any of piston cylinder utilizing fluid pressure such as hydraulic pressure, water pressure, air pressure, or gas pressure which is generated by inflation gas discharged from the inflator, motor utilizing electricity or the fluid pressure mentioned above, electromagnetic solenoid, spring that exerts biasing force when restoring, or the like, provided that it can move the anchor pin 11 in response to an electric signal from the control device 60. As shown in FIG. 3, in the opposite periphery of the slot 7b facing the actuator 12 on the underside of the bottom wall 7 is a support 7c for supporting the leading end of the pin 11 of the anchor mechanism 10 and preventing the same from coming off from the loop 58 in the engaging mode.

The retainer 18 is formed into an annular contour having bolts 18a. The retainer 18 is housed inside the airbag 21 such that the bolts 18a are inserted through a peripheral area 23 of a gas inlet port 24 of the airbag 21, the bottom wall 7 of the case 6 to project from the flange 14c of the inflator 14 and then be fastened with nuts 19, thereby attaching the airbag 21 and the inflator 14 to the case 6.

Figure 4:
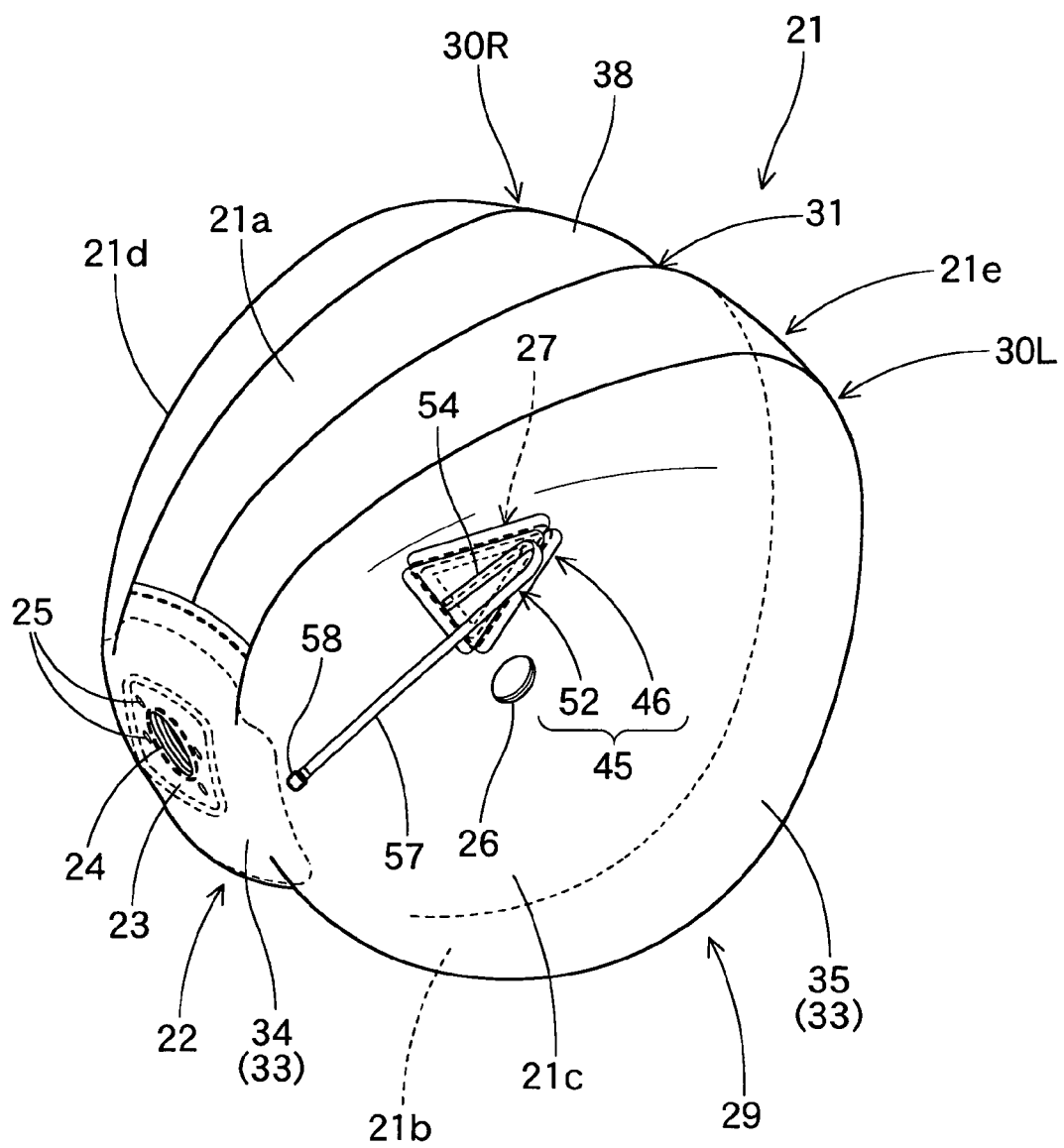
FIG. 4 is a perspective view of an airbag of the airbag apparatus inflated by itself as viewed from the front.
Figure 5:
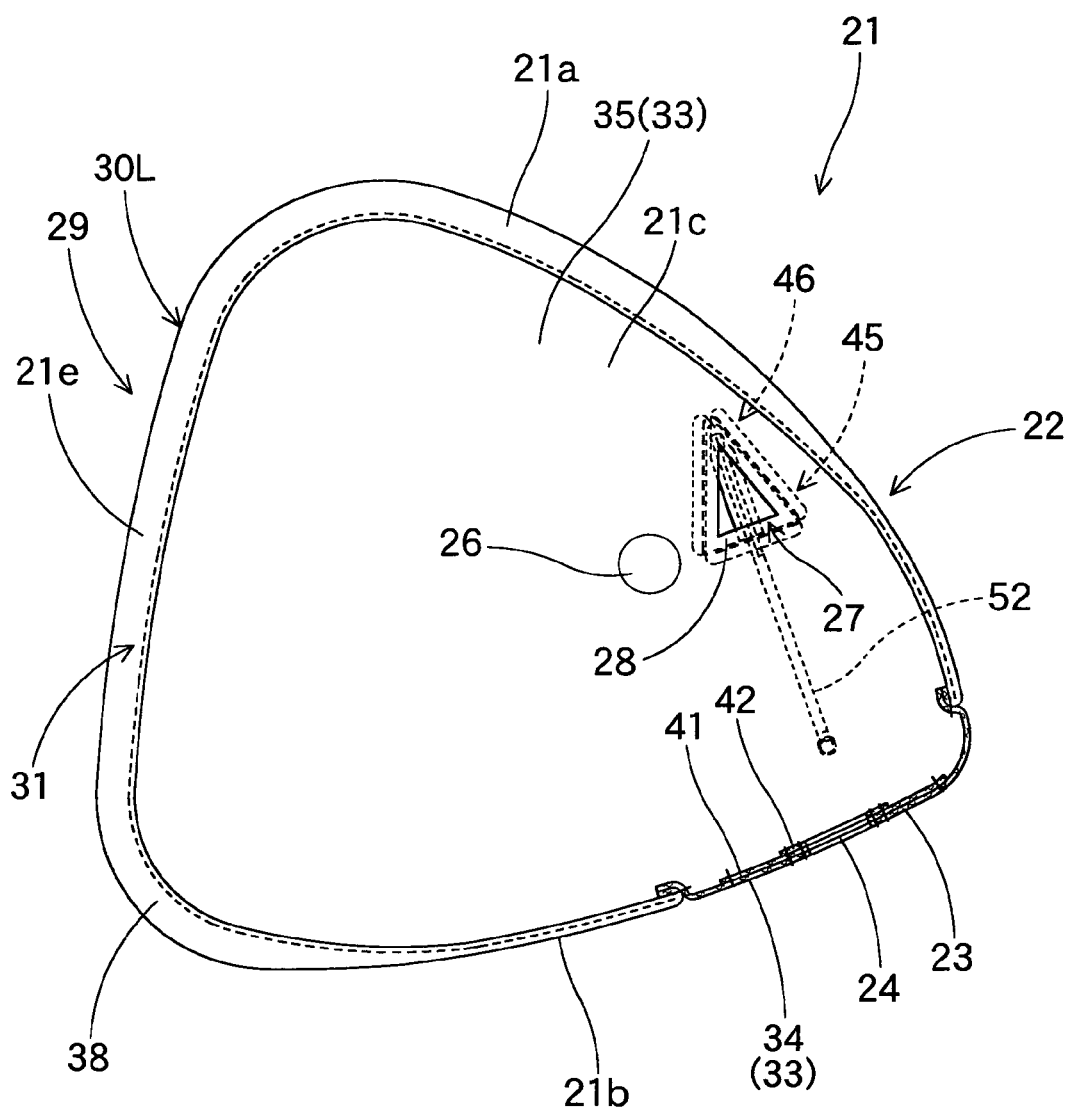
FIG. 5 is a sectional view of the airbag of FIG. 4 taken along the anteroposterior direction.

As shown in FIGS. 4 and 5, the airbag 21 is designed to be formed into a generally square conical shape whose front end is the top of the square cone, at full inflation. The airbag 21 includes an upper side wall 21a and a lower side wall 21b that extend generally along the lateral direction on upper and lower sides, a left side wall 21c and a right side wall 21d that extend generally along the anteroposterior direction on left and right sides, and a rear side wall 21e that extends generally along the lateral direction facing an occupant in such a manner as to connect the upper side wall 21a and lower side wall 21b. The airbag 21 of the embodiment includes an occupant protection area 29 arranged at the rear side to face the occupant upon airbag inflation, and a vehicle body side area 22 adapted to be arranged in front of the occupant protection area 29 and between the dashboard 1 and a wind shield 4 upon airbag inflation. The airbag 21 is provided with a round gas inlet port 24 for introducing inflation gas in the vicinity of the lateral center of a front end of the lower side wall 21b in the vehicle body side area 22 at inflation. Around the inlet port 24 are mounting holes 25 for receiving the bolts 18a of the retainer 18 to attach the peripheral area 23 of the port 24 to the bottom wall 7 of the case 6. On each of the left side wall 21c and right side wall 21d is a vent hole 26 for releasing extra inflation gas. The airbag 21 further includes above the vent hole 26 on the left side wall 21c a generally triangular exhaust hole 27. As shown in FIG. 5, the exhaust hole 27 of this specific embodiment has a generally isosceles triangular contour whose base extends generally along the anteroposterior direction at the bottom at full inflation of the airbag 21.

The occupant protection area 29 includes raised portions 30L and 30R that are configured to project rearward slightly and disposed side by side along the transverse direction. Each of the raised portions 30L and 30R is arranged along the vertical direction. Between the raised portions 30L and 30R is a recess 31 that is recessed forward slightly and extends vertically (FIGS. 4, 5, 9 and 10). The occupant protection area 29 of the embodiment is designed to arrest shoulders of the occupant MP moving forward by the raised portions 30L and 30R firstly to restrain the forward movement of the occupant MP and then receive a head of the occupant MP, whose forward movement has been restrained, softly by the recess 31 or between the raised portions 30L and 30R.

Figure 6:
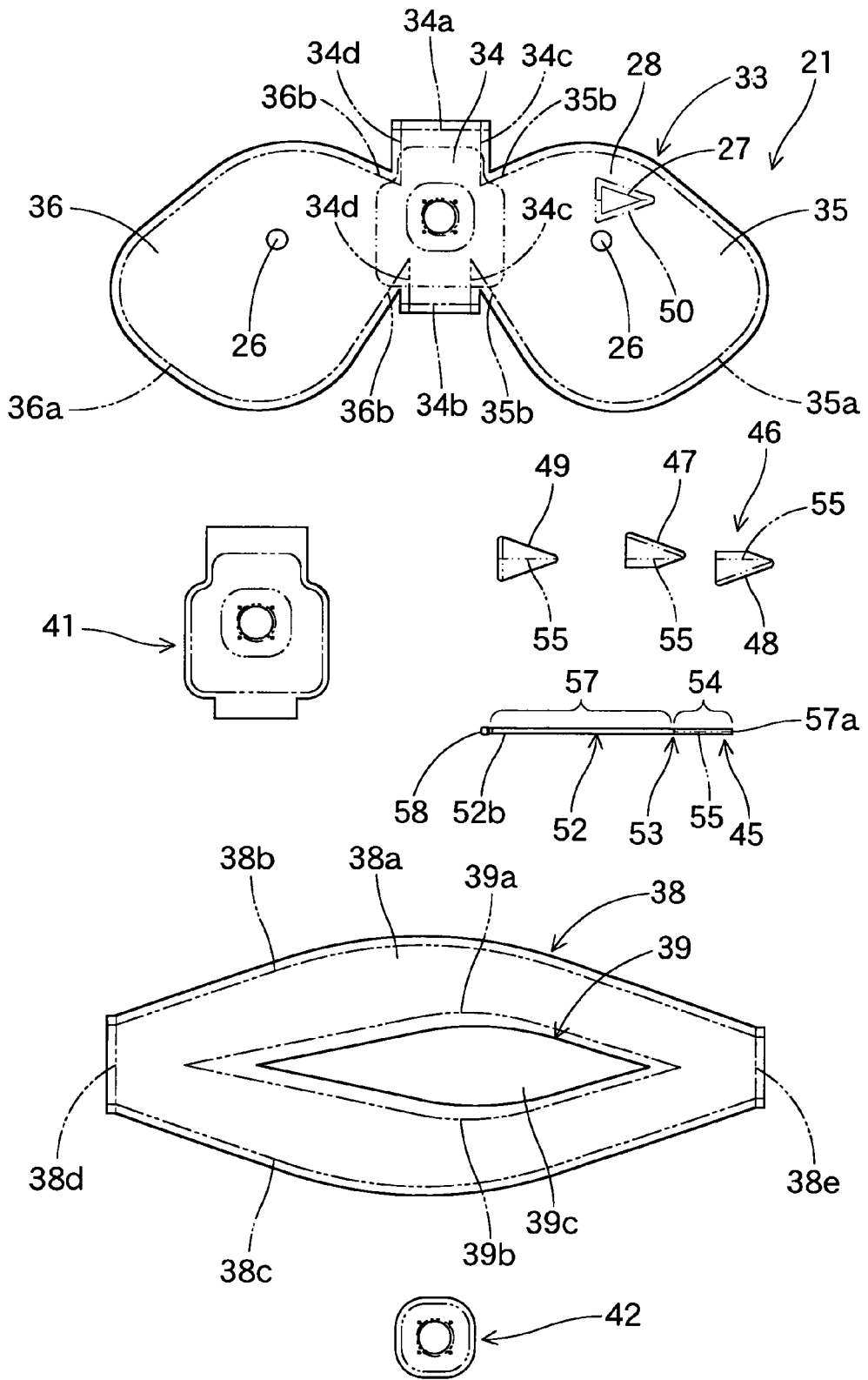
FIG. 6 illustrates components of the airbag of FIG. 4 by plan views.

The airbag 21 is made by joining peripheral edges of predetermined shaped base cloths that are formed of flexible fabric woven by polyamide, polyester yarn or the like. As shown in FIG. 6, the airbag 21 is comprised of a first base cloth 33 that constitutes the left side wall 21c, right side wall 21d and a front area 21ba of the lower side wall 21b and a second base cloth 38 that constitutes the upper side wall 21a, rear side wall 21e and a rear area 21bb of the lower side wall 21b.

The first base cloth 33 has a laterally symmetric contour proximate to a figure of a butterfly spreading its wings. As shown in FIG. 6, the first base cloth 33 includes a generally rectangular lower region 34 constituting the peripheral area 23 of the gas inlet port 24 in the vehicle body side area 22, and left and right regions 35 and 36 extending toward the left and right from the lower region 34 and each having a generally square plate shape. The lower region 34 makes the front area 21ba of the lower sidewall 21b of the airbag 21 at full inflation, which is the vicinity of the gas inlet port 24. The left and right regions 35 and 36 mainly constitute left and right side walls 21c and 21d of the airbag 21 at full inflation.

Referring to FIG. 6, the second base cloth 38 has a generally band shape in which the upper side wall 21a, rear side wall 21e and a region to make the rear area 21bb of the lower side wall 21b are arranged in series. The second base cloth 38 is configured wide at the center in the length direction i.e. in the anteroposterior direction as the airbag apparatus is mounted on vehicle with its both edges in the width direction or transverse direction curved. In the illustrated embodiment, the second base cloth 38 has a generally flat rhombic shape where a region to become the upper side wall 21a has a wider width than a region to become the lower side wall 21b. In the vicinity of the center of the second base cloth 38 is a cut-out portion 39 extending along the length direction of the cloth 38. The cut-out portion 39 is opened in a flat rhombic shape proximate to the outer contour of the second base cloth 38. In other words, the cut-out portion 39 is configured symmetric about the center line in the width direction of the base cloth 38, and is defined by peripheral edges 39a and 39b that curvedly project toward the outer edges of the cloth 38 at their centers and converge at opposite ends. The cut-out portion 39 is configured such that a widest portion 39c that has a widest opening width is located slightly toward a lower edge 38e of the base cloth 38, i.e. downward as the apparatus is mounted on vehicle, with respect to a widest portion 38a of the base cloth 38 that has a greatest width.

In this embodiment, the raised portions 30L and 30R and recess 31 in the occupant protection area 29 are formed by sewing up peripheral edges of the left and right regions 35 and 36 of the first base cloth 33 and the second base cloth 38, and peripheral edges 39a and 39b of the cut-out portion 39 of the second base cloth 38. The airbag 21 is further provided with two reinforcing cloths 41 and 42 for reinforcement of the peripheral area 23 of the gas inlet port 24 as shown in FIGS. 5 and 6.

The flap element 45 is disposed on the outside of the airbag 21 and includes a flap body 46 joined to a peripheral area 28 of the exhaust hole 27 for opening and closing the exhaust hole 27 and an adjusting belt 52 disposed to overlap with the flap body 46 for adjusting the opening/closing of the exhaust hole 27 by the flap body 46 as shown in FIGS. 4, 5, and 7 to 9.

Figure 7:
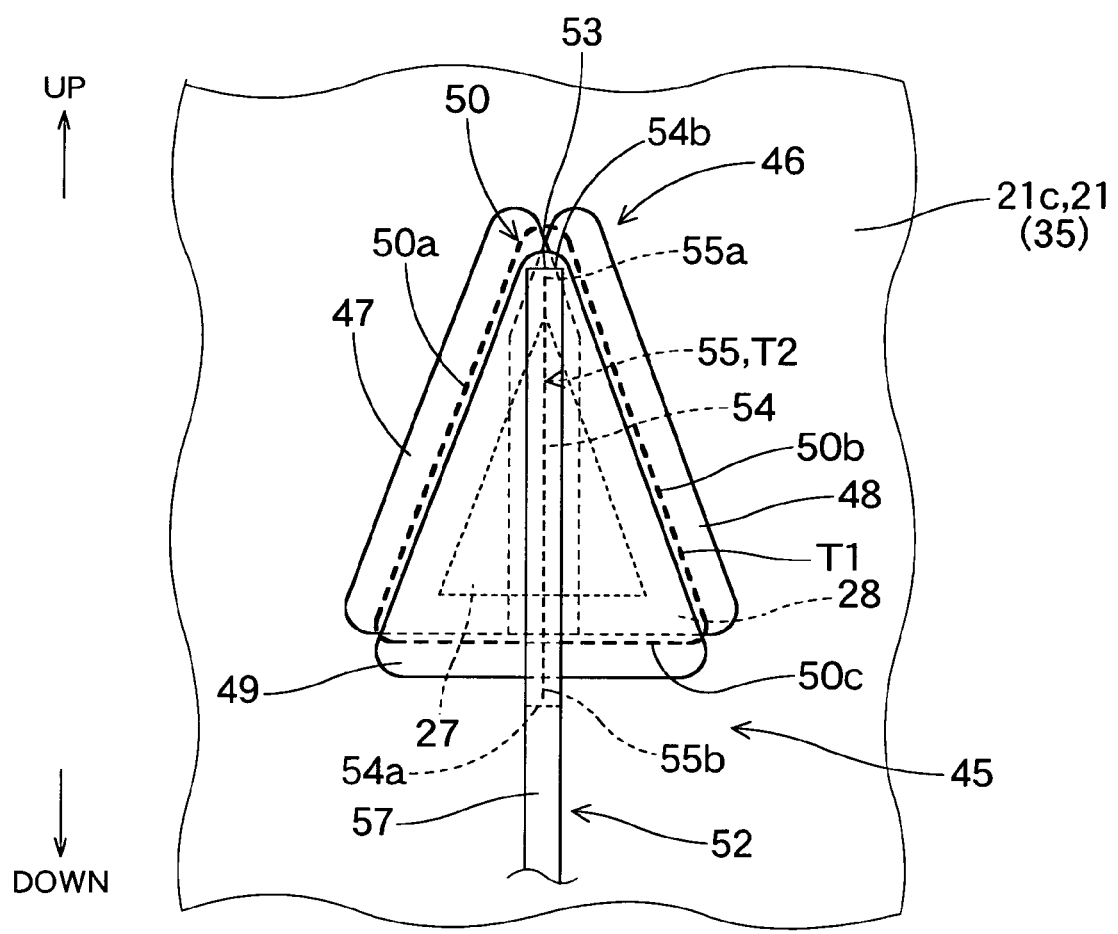
FIG. 7 is a partial enlarged plan view of an exhaust hole and its vicinity in the airbag of FIG. 4.
Figure 8A:
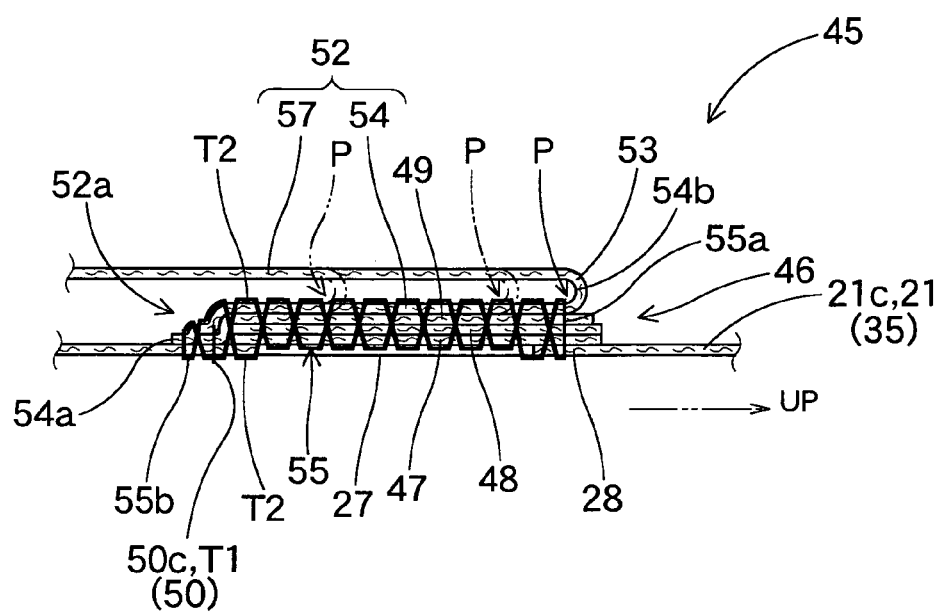
FIG. 8(a) is an enlarged sectional view of the exhaust hole and its vicinity generally taken along the anteroposterior direction.
Figure 8B:
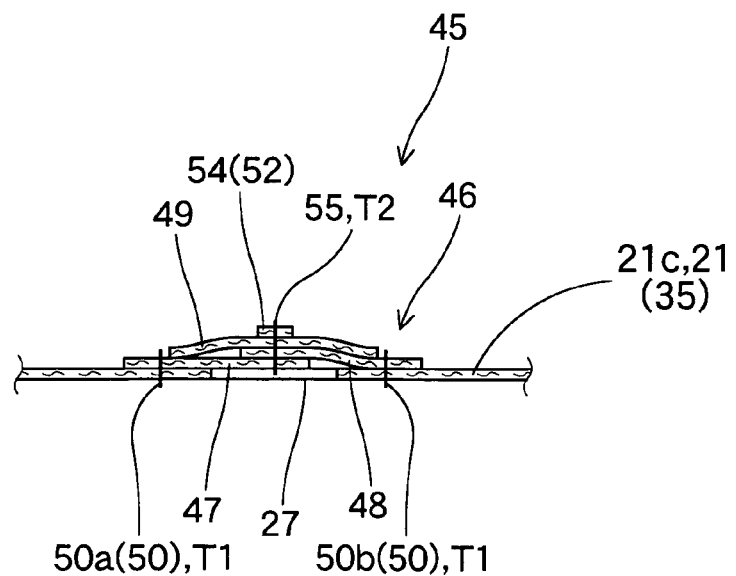
FIG. 8(b) is an enlarged sectional view of the exhaust hole and its vicinity generally taken vertically.
Figure 9:
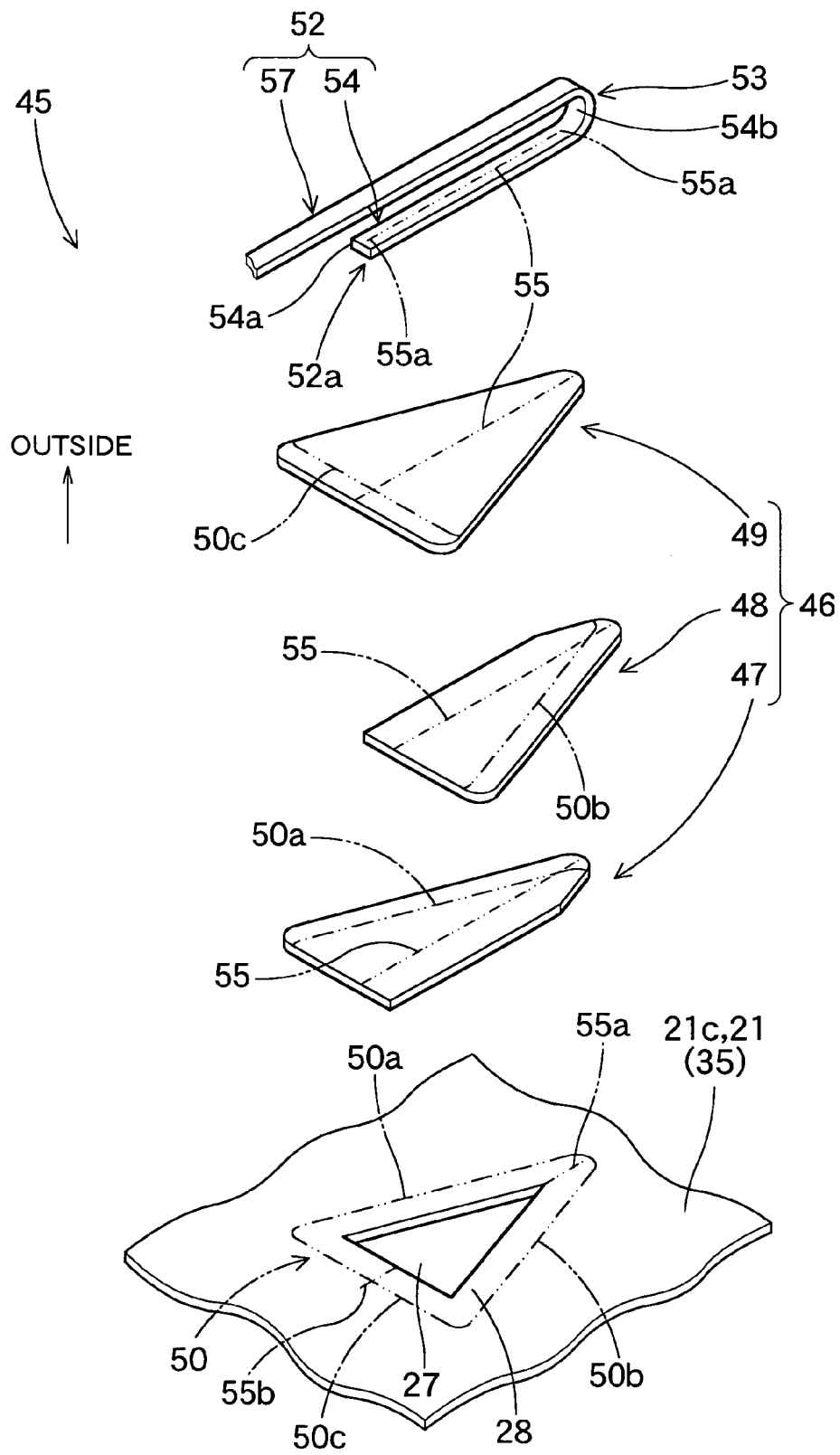
FIG. 9 is a schematic exploded perspective view illustrating a flap element and a periphery of the exhaust hole of the airbag of FIG. 4.

As shown in FIGS. 7-9, the flap body 46 is comprised of three flaps that are formed by flexible fabric woven by polyamide, polyester yarn as the airbag 21 and are disposed in piles on such location as to close off the exhaust hole 27; a first flap 47, a second flap 48 and a third flap 49. Out of the three flaps, only the third flap 49 that is disposed outmost is sized to be capable of closing off the whole exhaust hole 27 by itself. The third flap 49 is formed into an isosceles triangle generally similar to the exhaust hole 27. The first flap 47 and second flap 48 disposed inside of the third flap 49 each has such size as covers the exhaust hole 27 partially. The first flap 47 has such a contour that a rear end of an isosceles triangle generally identical to the third flap 49 is cut out vertically while the second flap 48 has such a contour that a front end of an isosceles triangle generally identical to the third flap 49 is cut out. More specifically, describing as located over the exhaust hole 27, the first flap 47 has such contour as covers an area between a later-described front side 50a of a sewn seam 50 and a sewn seam 55 including the peripheral area 28 with a region at the rear of the sewn seam 55 cut out. Likewise, the second flap 48 has such contour as covers an area between a later-described rear side 50b of the sewn seam 50 and the sewn seam 55 including the peripheral area 28 with a region in front of the sewn seam 55 cut out. The first flap 47, second flap 48 and third flap 49 overlap one another on the location of the sewn seam 55.

The first flap 47, second flap 48 and third flap 49 are sewn to the peripheral area 28 of the exhaust hole 27. More specifically, the first flap 47 is firstly placed on the outer side of the left side wall 21c in a slightly offset fashion to the front relative to the exhaust hole 27 in such a manner as to secure a seam allowance, and then the second flap 48 is placed over the first flap 47 in a slightly offset fashion to the rear relative to the exhaust hole 27 by a seam allowance. Then the third flap 49 is laid over the second flap 48 slightly offset downward by a seam allowance so as to close off the entire exhaust hole 27, and then sewing work is applied to the entire peripheral area 28 of the exhaust hole 27 using sewing thread T1 to provide a single continuous sewn seam 50 having a generally isosceles triangular shape similar to the contour of the exhaust hole 27 that joins all the flap 47, 48 and 49 to the peripheral area 28 of the exhaust hole 27. In other words, the first flap 47, second flap 48 and third flap 49 overlap one another on the location to close off the exhaust hole 27, and then are sewn to the left side wall 21c of the airbag 21, i.e. to the left region 35 of the first base cloth 33, by the sewn seam 50 that completely encompasses the peripheral area 28 of the exhaust hole 27. More specifically, as shown in FIGS. 7 to 9, the first flap 47 is sewn to the left side wall 21c by the front side 50a of the sewn seam 50, the second flap 48 is sewn to the left side wall 21c by a rear side 50b of the sewn seam 50 and the third flap 49 by the lower side 50c of the sewn seam 50. To paraphrase, the first flap 47, second flap 48 and third flap 49 that constitute the flap body 46 are sewn to the peripheral area 28 of the exhaust hole 27 in radial arrangement about the center of the exhaust hole 27. Furthermore, the first flap 47, second flap 48 and third flap 49 are sewn to a later-described joint portion 54 of the adjusting belt 52 together in the overlapped state.

The adjusting belt 52 is formed of a band-shaped cloth member having flexibility. The belt 52 is joined to the flap body 46 at the leading end 52a and joined at the root region 52a to the anchor mechanism 10 acting as the open/close mechanism. In this embodiment, the adjusting belt 52 is arranged vertically along the length direction of the exhaust hole 27 so as to be generally orthogonal to the base of the exhaust hole 27 as shown in FIGS. 5 and 7. The leading end 52a region of the belt 52 is folded back toward the flap body 46 and is sewn to the flap body 46 by sewing thread T2. That is, the region of the belt 52 between the turn-round point 53 (FIGS. 7, 8(a)) and the leading end 52a acts as a joint portion 54 to the flap body 46, while the region from the turn-round point 53 to the root portion 52b acts as a traction portion 57 that is connected with the anchor mechanism 10 for applying traction to the joint portion 54. In this specific embodiment, only the joint portion 54 is sewn to the flap body 46.

The joint portion 54 is configured by folding back the leading end 52a region of the belt 52 at the turn-round point 53 such that the length direction of the joint portion 54 conforms to that of the traction portion 57. The joint portion 54 is sewn to the flap body 46, i.e. to the first flap 47, second flap 48 and third flap 49, by a sewn seam 55 described below using sewing threads T2. In this specific embodiment, as best shown in FIG. 7, the joint portion 54 is disposed generally on the center of the width direction or anteroposterior direction of the exhaust hole 27 in such a manner as to cross over the exhaust hole 27 in the length direction or vertical direction. To paraphrase, the joint portion 54 is arranged to overlap with an opening area of the exhaust hole 27. The leading end 54a of the joint portion 54 is located on the lower side while the root portion 54b proximate the turn-round point 53 is located on the upper side facing away from the anchor mechanism 10 relative to the leading end 54a. The sewn seam 55 is formed to extend generally straightly along the length direction of the joint portion 54 generally in the center of the width direction of the joint portion 54 such that the first terminal 55a of the sewn seam 55 on the part of the root portion 54b or the turn-round point 53 is located on the upper side facing away from the anchor mechanism 10 upon airbag inflation relative to the second terminal 55b on the part of the leading end 54a.

In the illustrated embodiment, the sewn seam 55 sews the joint portion 54 not only to the flap body 46 but also to the peripheral area 28 of the exhaust hole 27 at the vicinities of the first terminal 55a and second terminal 55b. As shown in FIG. 8(a), the sewn seam 55 is comprised of two sewing threads T2 for needle and bobbin. More specifically, the first terminal 55a of the sewn seam 55 is located on the peripheral area 28 on top of the exhaust hole 27 and the second terminal 55b is positioned in front of the lower side 50c of the sewn seam 50 below the exhaust hole 27. In this embodiment, straight back stitches are applied to the vicinities of the first terminal 55a and second terminal 55b of the sewn seam 55 in an overlapping manner to prevent raveling. The breaking strength of the sewn seam 55 is designed such that the sewing threads T2 rupture from the part of the first terminal 55a when the airbag 21 inflates with the loop 58 anchored by the anchor pin 11 of the anchor mechanism 10. The breaking strength of the sewn seam 55 can be adjusted by changing stitch length and/or weight of the threads T2.

The traction portion 57 includes in the root portion 52b a loop 58 that is formed of a flexible string member for receiving the anchor pin 11 of the anchor mechanism 10. When the airbag 21 is folded up and housed in the case 6, the anchor pin 11 is inserted through the loop 58 so the anchor mechanism 10 anchors the loop 58 as shown in FIG. 2. The length of the traction portion 57 is so designed that the whole seam 55 that sews the joint portion 54 of the adjusting belt 52 to the flap body 46 ruptures securely when the airbag 21 inflates with the loop 58 anchored by the anchor pin 11. In other words, the length of the traction portion 57 is designed shorter than a direct distance between the second terminal 55b of the seam 55 and the anchor pin 11 on the fully inflated airbag 21.

Manufacturing of the airbag 21 is now described. The first base cloth 33 is provided with the vent holes 26 and exhaust hole 27 in advance. Firstly, the first flap 47 of the flap body 46 is arranged on the outer surface of the first base cloth 33 to cover the exhaust hole 27, and then the second flap 48 and third flap 49 are superimposed one on the other on the first flap 47 in a slightly offset manner by seam allowance but so as to cover the exhaust hole 27. Then all the flaps 47, 48 and 49 are sewn to the first base cloth 33 all along the peripheral edge 28 of the exhaust hole 27 with the sewing thread T1. Thus the flap body 46 is sewn to the first base cloth 33 by the sewn seam 50. Thereafter, the adjusting belt 52 preliminarily provided with the loop 58 is folded back at the turn-round point 53 to provide the joint portion 54, and the joint portion 54 is applied on the third flap 49 and sewn to the flap body 46, i.e., to the first flap 47, second flap 48 and third flap 49, and to the peripheral area 28 of the exhaust hole 27 with the sewing thread T2. In other words, the joint portion 54 is sewn to first flap 47, second flap 48 and third flap 49 by the sewn seam 55. Thus the flap element 45 is joined with the first base cloth 33. Subsequently, the reinforcing cloths 41 and 42 are laid over the first base cloth 33 in this order and sewn to the periphery 23 of the gas inlet port 24. Thereafter, punching work is applied to form the gas inlet port 24 and mounting holes 25. The gas inlet port 24 and mounting holes 25 may be formed on the first base cloth 33 and reinforcing cloths 41 and 42 in advance.

Subsequently, the second base cloth 38 is folded back at the center in the width direction such that peripheral edges 39a and 39b of the cut-out portion 39 overlap with each other, and then the peripheral edges 39a and 39b are sewn up together. Then the second base cloth 38 is opened so that seam allowances of the sewn-up peripheral edges 39a and 39b are disposed inside, and the upper edge 38d of the second base cloth 38 is sewn to the front edge 34a of the lower part 34 of the first base cloth 33. Likewise, the lower edge 38e of the second base cloth 38 is sewn to the rear edge 34b of the lower part 34 in the first base cloth 33. Then front and rear left edges 34c of the lower part 34 are sewn to root regions 35b of peripheral edge 35a in the left region 35, while right edges 34d are sewn to root regions 36b of the peripheral edge 36a in the right region 36. Thereafter, the peripheral edge 35a of the left region 35 and the left edge 38b of the second base cloth 38 are sewn up, while the peripheral edge 36a of the right region 36 and right edge 38c of the second base cloth 38 are sewn up. Then the airbag 21 is reversed inside out utilizing the gas inlet port 24 so that seam allowances may not appear outside. Thus the airbag 21 is manufactured.

To mount the airbag 21 thus manufactured on vehicle, the retainer 18 is placed inside the airbag 21 so that the bolts 18a project from the mounting holes 25. The airbag 21 is then folded up in that state and wrapped up by a tearable wrapping sheet (reference numeral omitted) to keep the folded-up configuration. At this time, the loop 58 of the adjusting belt 52 is taken out of the wrapping sheet. Then the folded-up airbag 21 is placed on the bottom wall 7 of the case 6 so that the bolts 18a project from the bottom wall 7 and the loop 58 projects out of the through hole 7b. Thereafter, the anchor pin 11 of the anchor mechanism 10 secured to the underside of the bottom wall 7 of the case 6 is put through the loop 58 projecting from the bottom wall 7 to hold it. Subsequently, the body 14a of the inflator 14 is set in the insert hole 7a from lower side of the bottom wall 7 while the bolts 18a protruded downward from the bottom wall 7 are inserted through the flange 14c of the inflator 14. Thereafter, by fastening the bolts 18a protruded from the flange 14c of the inflator 14 into nuts 19, the airbag 21 and inflator 14 are attached to the bottom wall 7 of the case 6.

Then if the circumferential wall 8 of the case 6 is attached to the joint wall 16c of the airbag cover 16 of the dashboard 1 that has been mounted on vehicle, and the brackets of the case 6 are fixed to predetermined locations of the vehicle body, the airbag apparatus M is mounted on vehicle.

In the event of collision of vehicle after mounting the airbag apparatus M on vehicle, the control device 60 feeds an actuating signal to the inflator 14 so that inflation gas G is discharged from the gas discharge ports 14b of the inflator 14 to inflate the airbag 21. Then the airbag 21 inflates and breaks the wrapping sheet, and pushes and opens the doors 16a and 16b of the airbag cover 16 as indicated by double-dashed lines in FIG. 1. Then the airbag 21 protrudes upward from an opening provided by the opening of the doors 16a and 16b and deploys rearward in such a manner as to fill in a space between the top face 2 of the dashboard 1 and windshield 4. Thus the airbag 21 completes inflation as indicated by double-dashed lines in FIG. 1.

Figure 12:
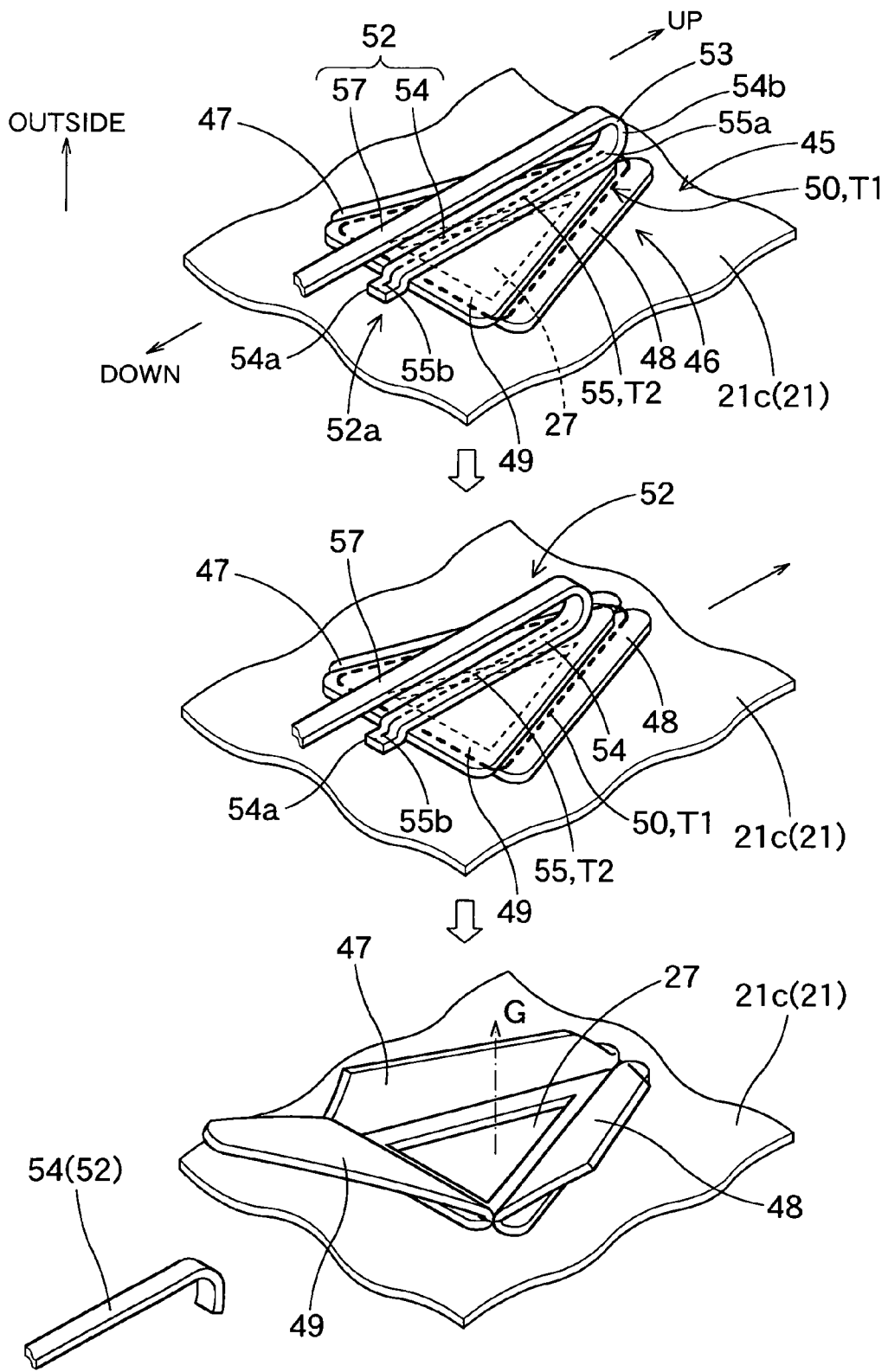
FIG. 12 schematically illustrates a process that a joint portion of the flap element is separated from a flap body for allowing the flap body to open up.

In the airbag apparatus M of this embodiment, when the airbag 21 inflates with the adjusting belt 52 anchored by the anchor mechanism 10, the flap body 46 connected to the peripheral area 28 of the exhaust hole 27 of the airbag 21 moves upward and away from the anchor mechanism 10 along with airbag deployment. The length of the area between the anchor mechanism 10 and joint portion 54, i.e. the length of the traction portion 57, of the adjusting belt 52 is constant and the adjusting belt 52 is anchored by the anchor mechanism 10. Accordingly, when the flap body 46 moves upward and away from the anchor mechanism 10 along with airbag deployment, the flap body 46 pulls the adjusting belt 52 such that the area between the anchor mechanism 10 and joint portion 54, i.e., the traction portion 57, is stretched straightly, and further pulls the joint portion 54 away from the anchor mechanism 10. Then the sewing threads T2 rupture so that the joint portion 54 is separated from the flap body 46 as shown in FIG. 12, so that the flap body 46 is allowed to flare out to open the exhaust hole 27 while further moving upward and away from the anchor mechanism 10.

In the airbag apparatus M of the embodiment, the sewn seam 55 that sews the joint portion 54 of the adjusting belt 52 to the flap body 46 is formed generally straightly and such that the first terminal 55*a* on the part of the root end 54*b* from which the seam 55 starts to rupture is located on the upper side facing away from the anchor mechanism 10 relative to the second end 55*b* on the part of the leading end 54*a*. More specifically, the adjusting belt 52 is sewn to the flap body 46 only at the joint portion 54, and the traction portion 57 that is not sewn to the flap body 46 is reversed from the joint portion 54 at the turn-round point 53.

With this configuration, a rupture point P beginning rupture is arranged at the turn-around point 53 side, i.e., root end 54*b* side. When pulled by the flap body 46, the joint portion 54 is subjected to such traction force as pulls the joint portion 54 away from the flap body 46 relative to the left side wall 21*c* and flap body 46 that move upward as shown in FIG. 8. The traction force concentrates on the first terminal 55*a* of the joint portion 54 disposed proximate the turn-round point 53 so that the needle or bobbin thread T2 of the sewn seam 55 rupture stitch by stitch from the first terminal 55*a* to the second terminal 55*b*. That is, the sewn seam 55 ruptures in such a manner that a rupture point, which is shown at P in FIG. 8(*a*), moves from the first terminal 55*a* on the part of the turn-round point 53 toward the second terminal 55*b* on the part of the leading end 52*a* of the adjusting belt 52. Therefore, the sewing threads T2 of the sewn seam 55 rupture smoothly and swiftly such that the joint portion 54 is separated from the flap body 46 quickly. Hence the flap body 46 is pushed by the inflation gas G and opens up to uncover the exhaust hole 27.

Especially, since the sewn seam 55 of this specific embodiment is configured such that its length direction generally conforms to that of the traction portion 57 of the adjusting belt 52, i.e. to the tractional direction of the traction portion 57, the traction force of the flap body 46 easily concentrates on the first terminal 55*a* so that the sewing threads T2 that provides the sewn seam 55 rupture swiftly. Although the sewn seam 55 of this embodiment ruptures wholly due to propagation of rupture of the sewing thread T2 so that the joint portion 54 is completely removed from the flap body 46 when the airbag 21 inflates with the adjusting belt 52 anchored by the anchor mechanism 10, it will also be appreciated that the sewn seam 55 does not rupture wholly but remains sewn at the vicinity of the second terminal 55*b* in such a manner as to allow the flap body 46 to open. In this instance, the length of the adjusting belt 52 is lengthened so as to permit the airbag 21 to inflate to the full after rupture of the sewn seam 55 when the airbag 21 inflates with the loop 58 anchored by the anchor pin 11.

Therefore, with the airbag apparatus M of the invention, the flap element 45 smoothly opens to uncover the exhaust hole 27.

Figure 10:
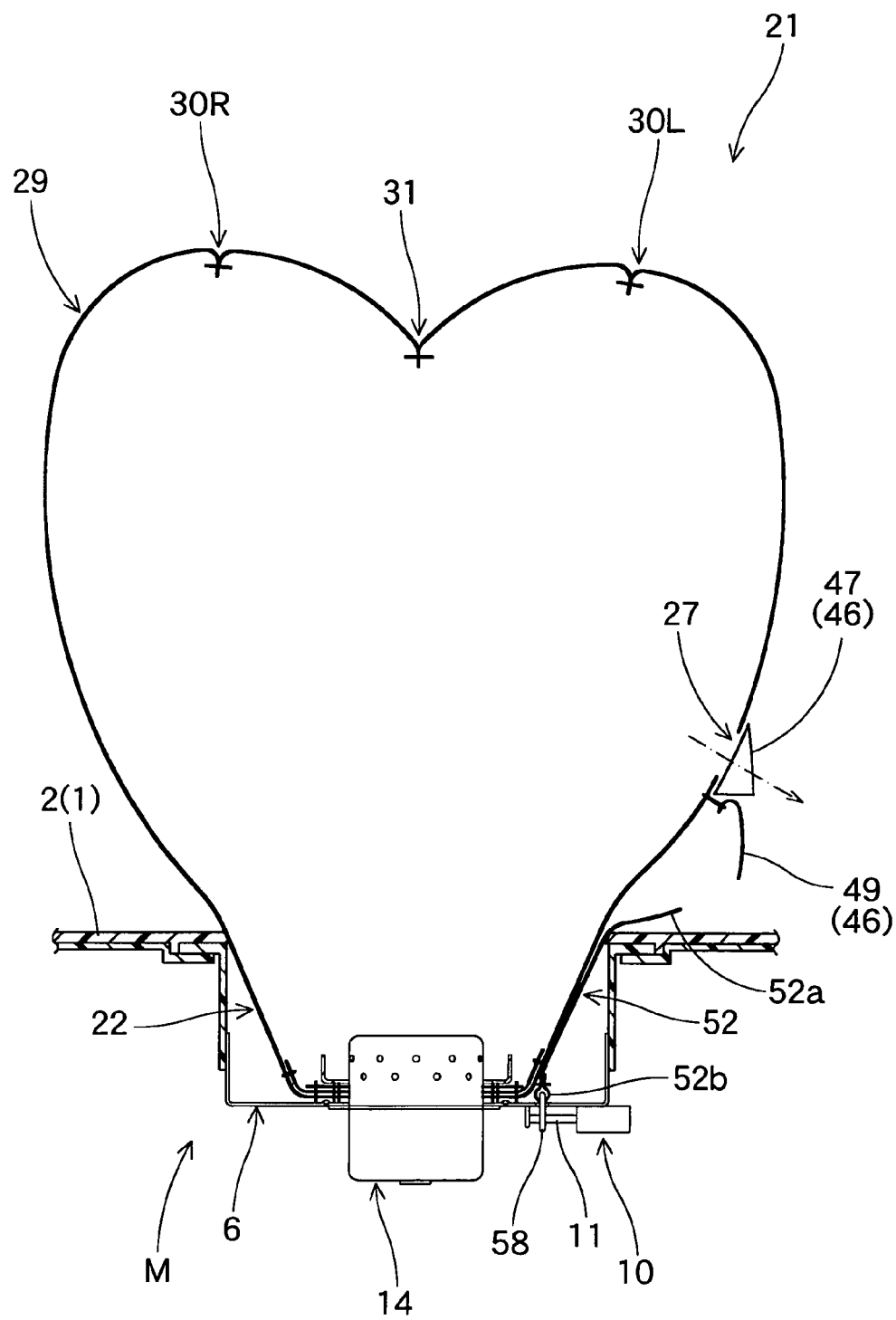
FIG. 10 is a schematic section of the airbag apparatus of FIG. 1 where the airbag is fully inflated with the exhaust hole opened up.

In the airbag apparatus M of the first embodiment, if the control device 60 detects, for example a small-sized occupant MP1 being seated or an occupant MP seated proximate the dashboard 1 by signals supplied from the sensors 61, 62 and 63, the control device 60 does not actuate the actuator 12 of the anchor mechanism 10 so that the airbag 21 inflates with the loop 58 anchored by the anchor pin 11, i.e., with the adjusting belt 52 retained by the anchor mechanism 10. Then the seam 55 that sews the joint portion 54 of the adjusting belt 52 to the flap body 46 ruptures during airbag inflation by breaking the sewing threads T2 from the first terminal 55*a*, so that the joint portion 54 is separated from the flap body 46 and thereby allowing the flap body 46 to open. Hence extra inflation gas G is released from the exhaust hole 27 as shown in FIG. 10 and the airbag 21 completes inflation with suppressed internal pressure, so that it protects the small-sized occupant MP1 or the occupant MP seated proximate the dashboard 1 properly by not applying undue pressure to him or her (FIG. 1).

Figure 11:
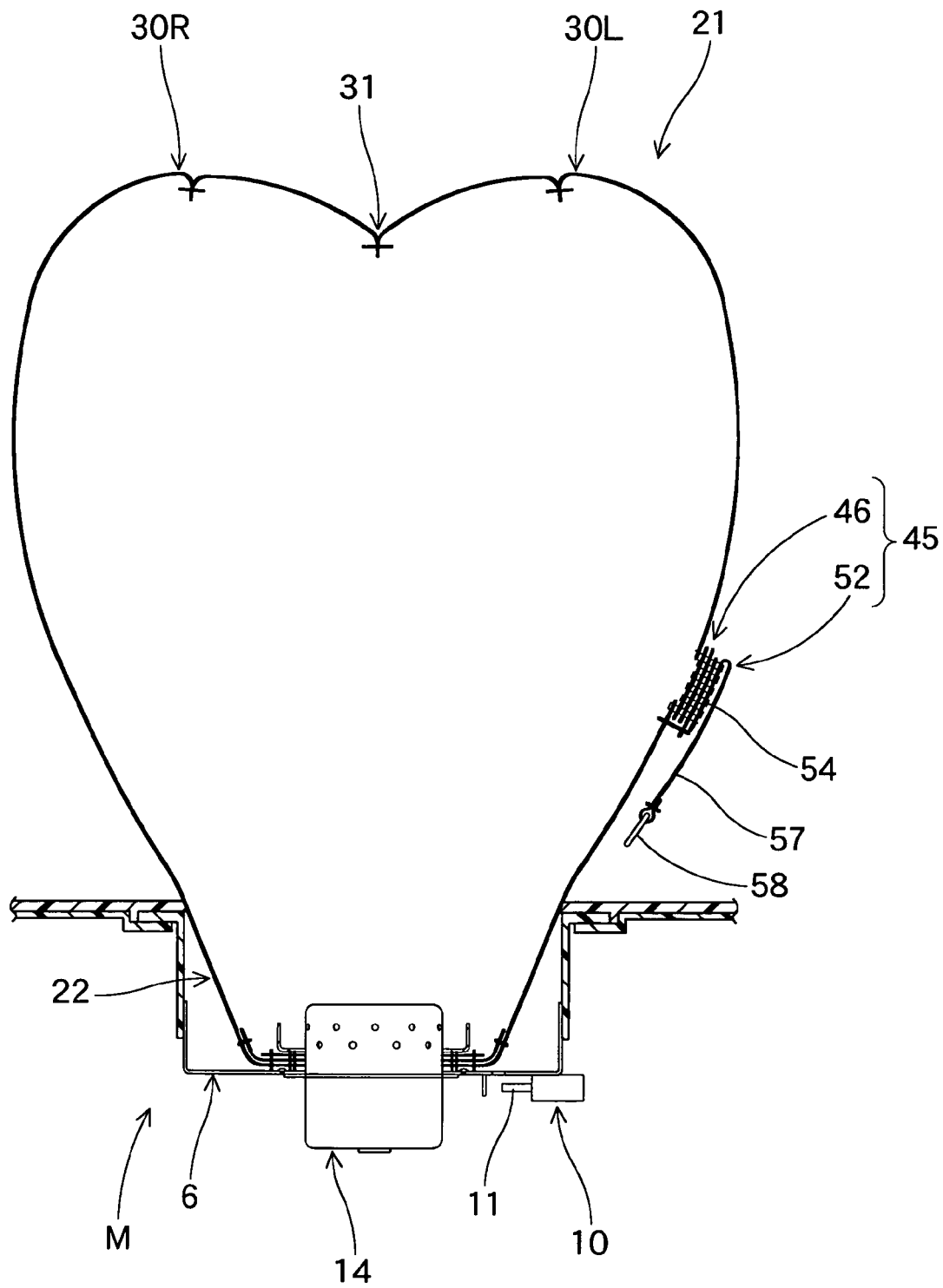
FIG. 11 is a schematic section of the airbag apparatus of FIG. 1 where the airbag is fully inflated with the exhaust hole closed.

To the contrary, if the control device 60 detects a large-sized occupant MP2 being seated or an occupant MP seated away from the dashboard 1, it feeds an actuating signal to the actuator 12 generally simultaneously with the operation of the inflator 14 to retract the anchor pin 11 so that the loop 58 is disengaged from the pin 11 and the airbag 21 inflates with the adjusting belt 52 released from the anchor mechanism 10. In this instance, the airbag 21 completes inflation with the exhaust hole 27 closed off as shown in FIG. 11, and the emission of the inflation gas G from the exhaust hole 27 is inhibited. Hence the airbag 21 is allowed to secure sufficient internal pressure and cushions the large-sized occupant MP2 or the occupant MP seated away from the dashboard 1 properly without bottoming out.

Although the sewn seam 55 of the foregoing embodiment is formed by two sewing threads T2 for needle and bobbin, it may be formed of a single thread. In that instance, too, the seam ruptures from the first terminal to the second stitch by stitch.

In the airbag apparatus M, the flap body 46 is comprised of three flaps; the first flap 47, second flap 48 and third flap 49 that are superimposed one above another on the location to close off the exhaust hole 27 and sewn together with the joint portion 54 by the sewn seam 55. This configuration will prevent leading end regions of the flaps 47, 48 and 49 from riding up due to the inflation gas when the airbag 21 inflates having the adjusting belt 52 disengaged from the anchor mechanism 10, thereby inhibiting gas leakage from the exhaust hole 27. Of course, when the airbag 21 inflates with the adjusting belt 52 anchored by the anchor mechanism 10, the sewing threads T2 of the sewn seam 55 tear out to separate the flap body 46 from the joint portion 54 of the adjusting belt 52, so that the flaps 47, 48 and 49 of the flap body 46 smoothly open to expose the exhaust hole 27. Especially in this embodiment, the flaps 47, 48 and 49 of the flap body 46 are sewn to the periphery 28 of the exhaust hole 27 in radial arrangement about the center of the exhaust hole 27. Therefore, each of the flaps 47, 48 and 49 opens smoothly without being affected by other flaps.

Moreover, in the airbag apparatus M, the joint portion 54 of the adjusting belt 52 is arranged to overlap with the opening area of the exhaust hole 27. With this configuration, the flaps 47, 48 and 49 of the flap body 46 are sewn together with the joint portion 54 by the seam 55 that is arranged to overlap with the opening area of the exhaust hole 27. In other words, the sewn seam 55 sews the flaps 47, 48 and 49 together in the vicinity of the center of the exhaust hole 27, and therefore, prevents the flaps 47, 48 and 49 from deviating from one another when the airbag 21 inflates with the adjusting belt 52 disengaged from the anchor mechanism 10, even if they are pushed by the inflation gas. That is, this configuration does not necessitate making all the flaps 47, 48 and 49 of the flap body 46 large enough to close off the whole exhaust hole 27. As in this embodiment, gas leakage from the exhaust hole 27 is prevented as much as possible even by the flap body 46 whose first flap 47 and second flap 48 are so sized as to cover only areas from the joint or sewn seam 50a/50b to the periphery 28 of the exhaust hole 27 to the sewn seam 55. This configuration requires less base material for the flaps 47, 48 and 49 of the flap body 46 in comparison with an instance where more than one flaps of the flap body are sized to close off the whole exhaust hole. If such an advantage does not have to be considered, the adjusting belt may include a joint portion that is not arranged to overlap with the opening area of the exhaust hole.

Furthermore, the sewn seam 55 of the airbag apparatus M sews the joint portion 54 of the adjusting belt 52 not only to the flap body 46 but also to the periphery 28 of the exhaust hole 27 at the vicinities of the first terminal 55a and second terminal 55b. With this configuration, the flaps 47, 48 and 49 of the flap body 46 are sewn to the periphery 28 of the exhaust hole 27 not only by the seam 50 that sews the flap body 46 to the periphery 28 of the exhaust hole 27 but also by the seam 55 that sews the adjusting belt 52 to the flap body 46. This arrangement further inhibits leakage of inflation gas from the exhaust hole 27 when the airbag 21 inflates with the adjusting belt 52 released from the anchor mechanism 10. If such an advantage does not have to be considered, the joint potion of the adjusting belt may be sewn to the flap body only within the area of the exhaust hole.

In addition, the flap element 45 of the foregoing embodiment is located on the outside of the airbag 21 such that the flap body 46 closes off the exhaust hole 27 from outside of the airbag 21. With this configuration, the flap body 46 will open smoothly when pushed by inflation gas in comparison with an instance where the flap body is located inside the airbag.

Figure 13:
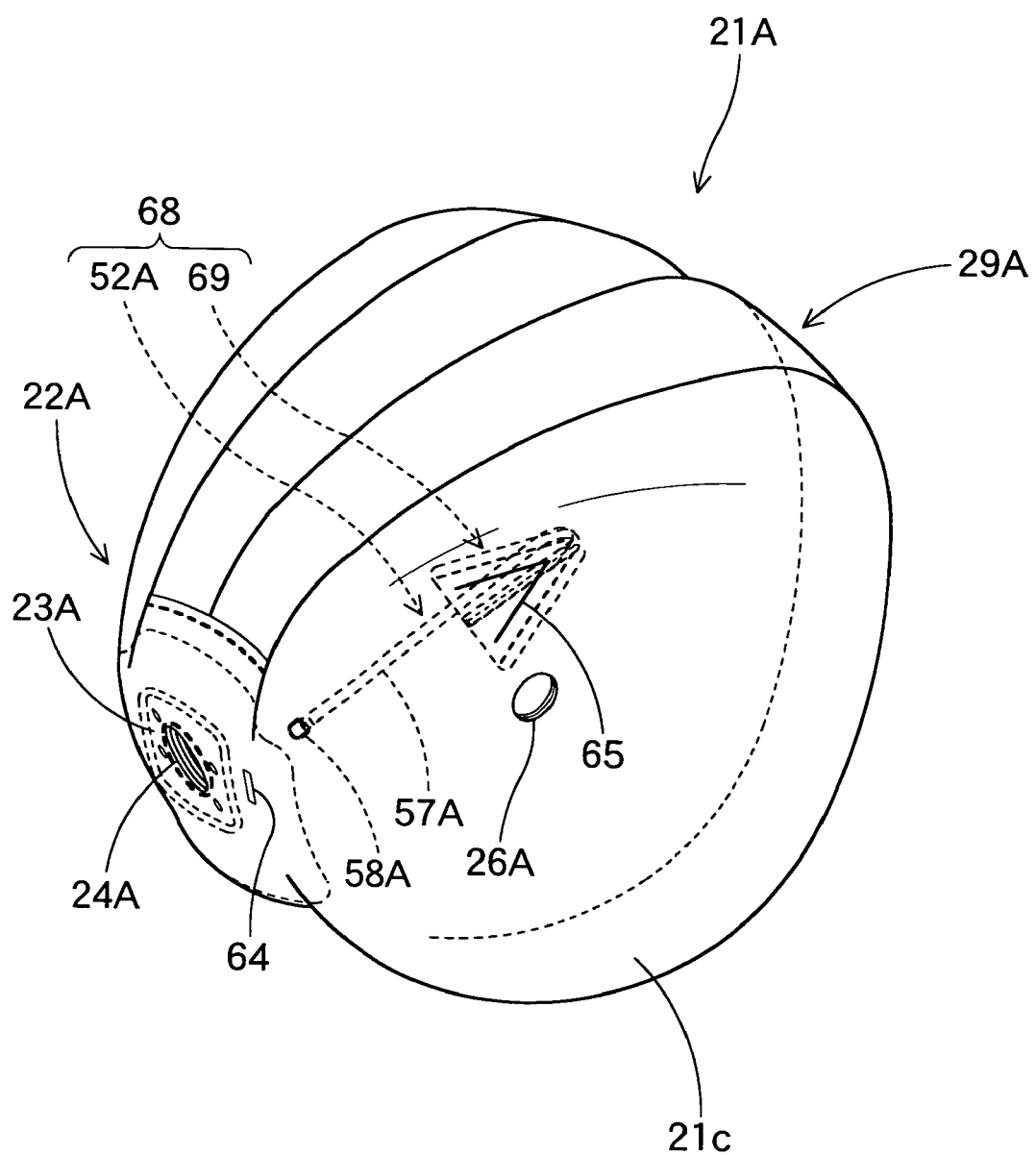
FIG. 13 is a perspective view of an airbag provided with a modification of the flap element as inflated by itself.
Figure 14:
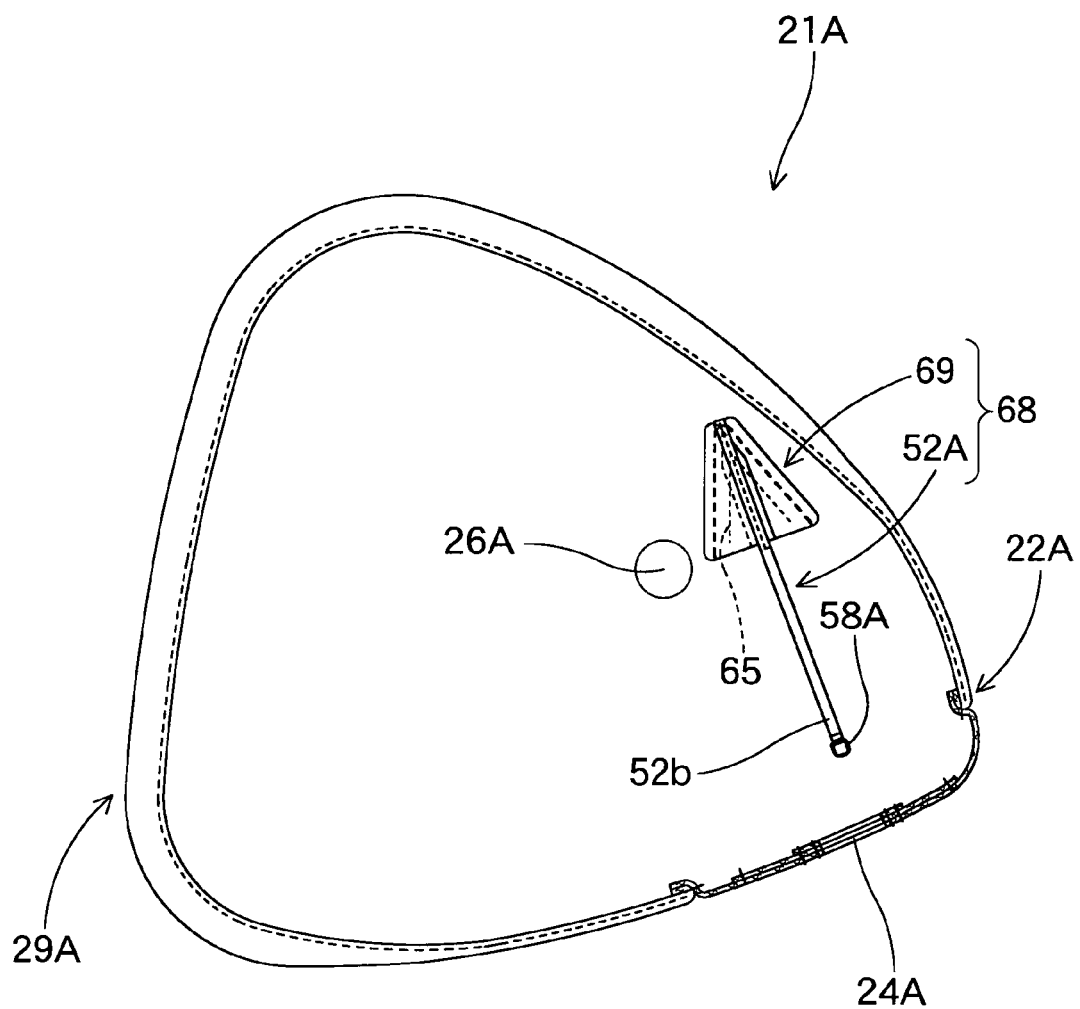
FIG. 14 is a sectional view of the airbag of FIG. 13 taken along the anteroposterior direction.

An alternative embodiment is now described. An airbag 21A shown in FIGS. 13 and 14 internally includes a flap element 68 for opening and closing an exhaust hole 27A. The airbag 21A has the same structure as the airbag 21 described above except in that it includes proximate a gas inlet port 24A an aperture 64 for taking out a loop 58A formed at a root 52b of an adjusting belt 52A and in that the exhaust hole 27A is comprised of a slit 65. Therefore, descriptions of common members and parts will be omitted by assigning reference signs "A" at the end of reference numerals.

As shown in FIGS. 13 to 16, the exhaust hole 27A is comprised of a slit 65 formed on the left side wall 21c (the left region 35 in the first base cloth 33) of the airbag 21A. The slit 65 has a generally inverse-V shape projecting upward, i.e., toward the turn-round point 53A of the adjusting belt 52A at the center. In this embodiment, the exhaust hole 27A is adapted to be exposed when a region 66 on the left side wall 21c surrounded by the slit 65 opens about a line 65c (refer to the dashed line in FIG. 15) that links opposite ends 65a and 65b of the slit 65. The region 66 that is surrounded by the slit 65 acts as a first flap 66 of a flap body 69.

Figure 15:
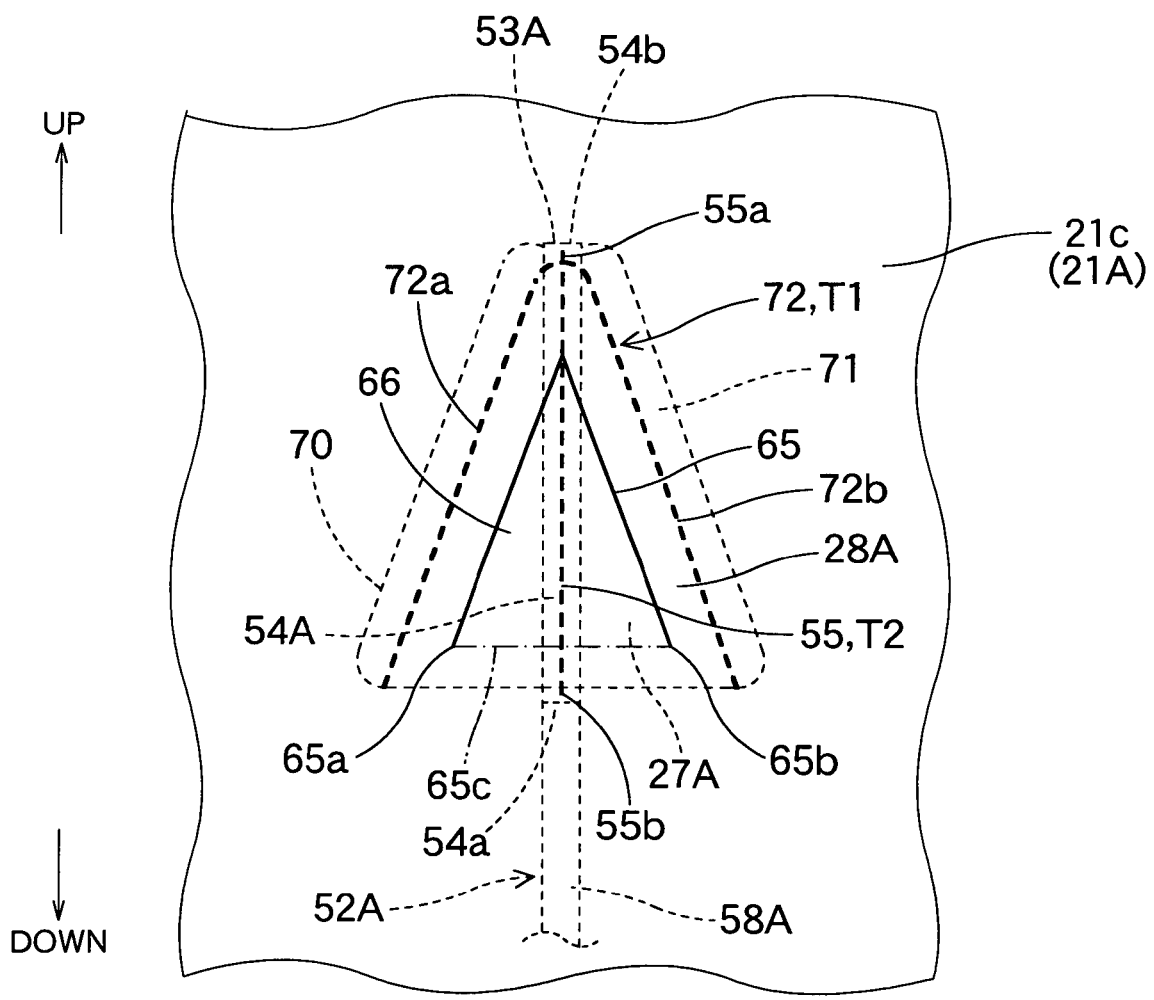
FIG. 15 is a partial enlarged plan view of an exhaust hole and its vicinity in the airbag of FIG. 13.
Figure 16:
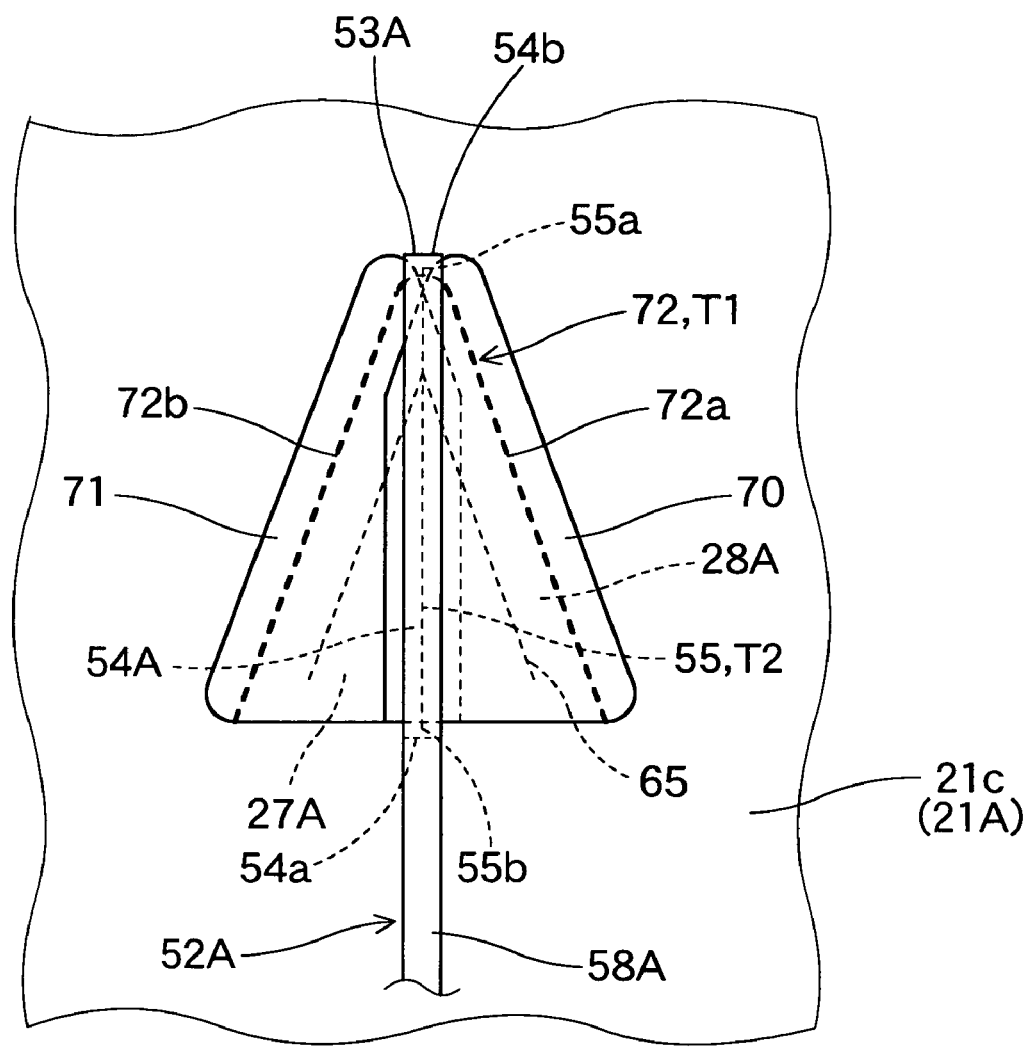
FIG. 16 is a partial enlarged view of the exhaust hole of FIG. 15 as viewed from the interior of the airbag.
Figure 17:
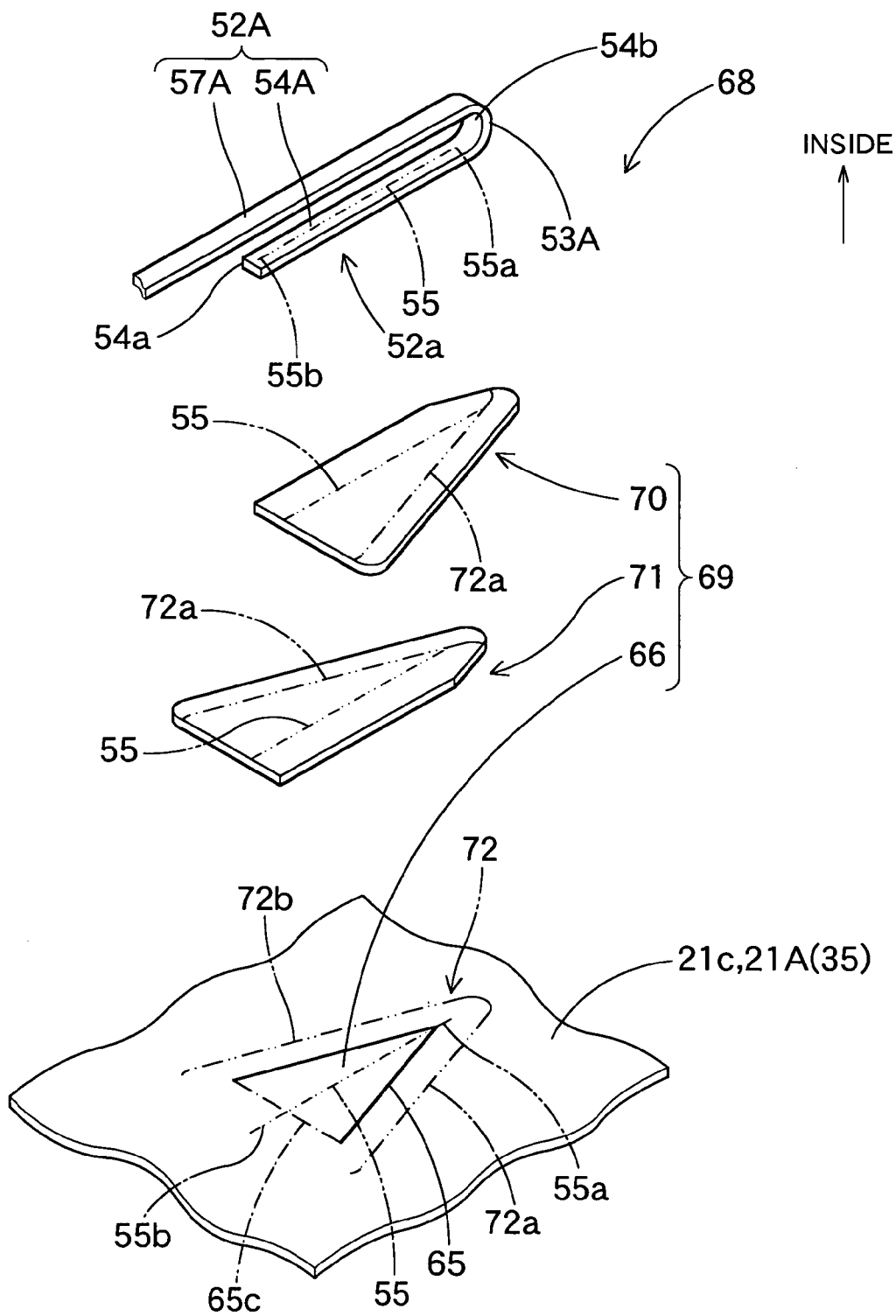
FIG. 17 is a schematic exploded perspective view illustrating the flap element, the exhaust hole and its vicinity of the airbag of FIG. 13.
Figure 18:
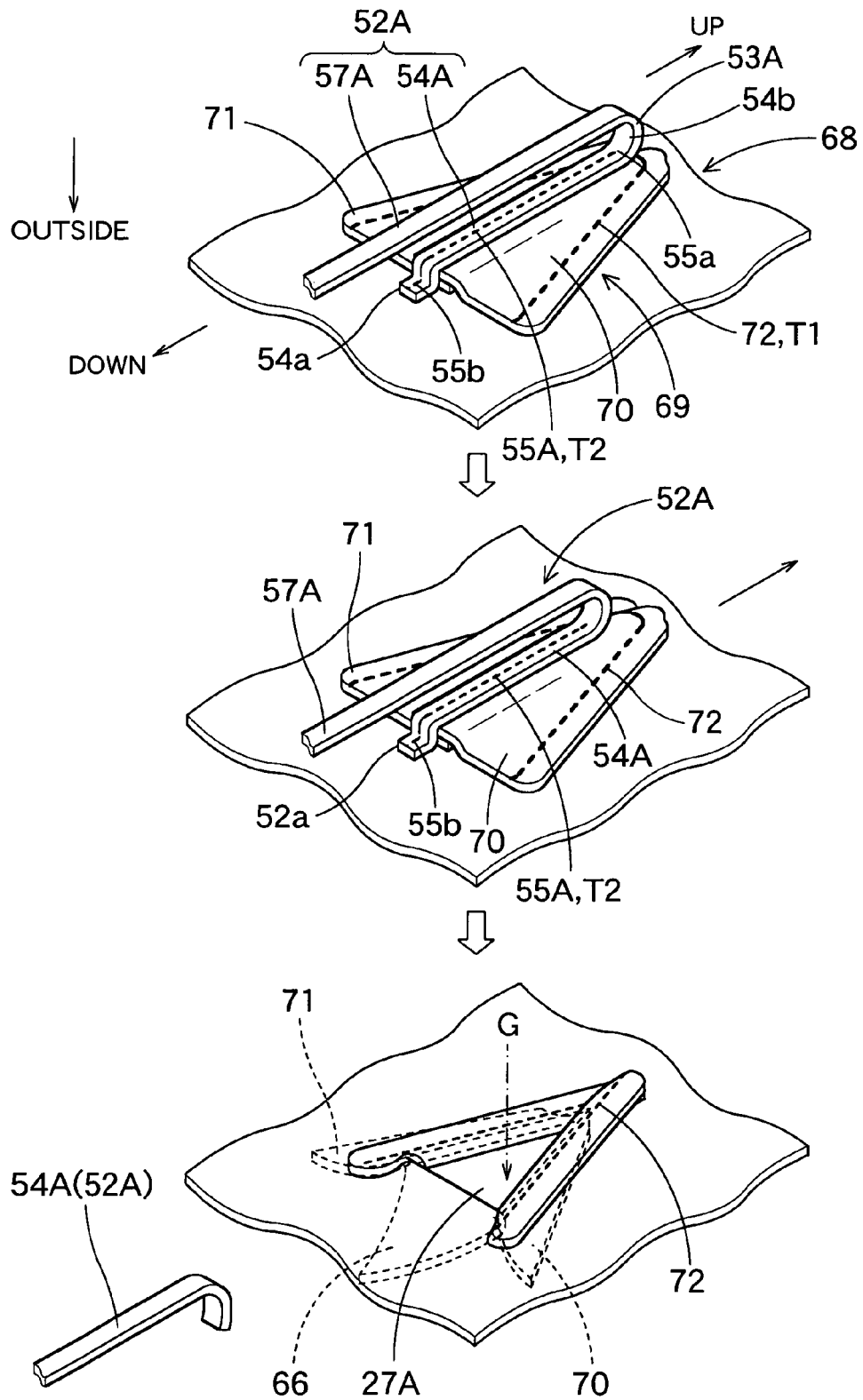
FIG. 18 schematically illustrates a process that a joint portion of the flap element of FIG. 17 is separated from a flap body for allowing the flap body to open up.

The flap element 68 is located inside the airbag 21A and includes a flap body 69 joined to the peripheral area 28A of the exhaust hole 27A for opening and closing the exhaust hole 27A and an adjusting belt 52A disposed to overlap with the flap body 69 for controlling the opening/closing of the exhaust hole 27A by the flap body 69 as shown in FIGS. 15 to 17. The adjusting belt 52A has the same structure as the adjusting belt 52 of the flap element 45 described above except in that it is located inside the airbag 21A, and therefore, descriptions of common parts will be omitted by assigning reference signs "A" at the end of reference numerals.

The flap body 69 is comprised of three flaps; the first flap 66 constituted by the region 66 closing off the exhaust hole 27A, a second flap 70 and a third flap 71 disposed in piles inside of the first flap 66 and on such location as to close off the exhaust hole 27A. The second flap 70 and third flap 71 are formed by flexible fabric woven by polyamide, polyester yarn as the airbag 21A. The second flap 70 and third flap 71 are sewn to the periphery of the slit 65 on the left side wall 21c of the airbag 21A by a generally inverse-V shaped seam 72. More specifically, as shown in FIGS. 15 to 17, the front side 72a of the sewn seam 72 sews the second flap 70 and the rear side 72b of the seam 72 sews the third flap 71, to the left side wall 21c. That is, in the flap body 69, too, the first flap 66, second flap 70 and third flap 71 are joined to the periphery 28A of the exhaust hole 27A in radial arrangement about the center of the exhaust hole 27A.

In the flap body 69, too, only the first flap 66 is sized to be capable of closing off the whole exhaust hole 27A by itself. The second flap 70 and third flap 71 each has such size as covers the exhaust hole 27A partially. Similar to the first flap 47 and second flap 48 of the flap body 46 described above, as shown in FIG. 17, each of the second flap 70 and third flap 71 has such a contour that a farther region relative to a sewn seam 55A that sews the flap body 69 to the joint portion 54A of the adjusting belt 52A, i.e. a region facing away from the sewn seam 72, is cut out. The first flap 66, second flap 70 and third flap 71 overlap one another on the location to close off the exhaust hole 27A and are sewn together to the joint portion 54A of the adjusting belt 52A by the sewn seam 55A. As in the afore-described flap element 45, the first terminal 55a of the sewn seam 55A is located at the rear of the sewn seam 72 in the rear of the exhaust hole 27A and the second terminal 55b is positioned in front of the line 65c linking the opposite ends 65a and 65b of the slit 65 in front of the exhaust hole 27A. That is, the sewn seam 55A sews the joint portion 54A of the adjusting belt 52A to the periphery 28A of the exhaust hole 27A at the vicinities of the first terminal 55a and second terminal 55b.

With the foregoing flap element 68, when the airbag 21A inflates in a condition where the adjusting belt 52A is anchored by the anchor mechanism 10, the traction force of the flap body 69 easily concentrates on the first terminal 55a that is located farther away from the anchor mechanism 10 than the second terminal 55b, so that the sewing threads T2 of the sewn seam 55A tear out sequentially from the first terminal 55a toward the second terminal 55b smoothly. Thus the flap element 68 provides the same operation and advantage as the flap body 45 described above. Since the flap element 68 of the alternative embodiment is located inside the airbag 21A, the second flap 70 and third flap 71 of the flap body 69 closes off the exhaust hole 27A from inside of the airbag 21A. With this configuration, the second flap 70 and third flap 71 need to pass through the exhaust hole 27A in order to open up the exhaust hole 27A. Accordingly, leakage of inflation gas from the exhaust hole 27A is inhibited when closed by the second flap 70 and third flap 71 in comparison with an instance where the flap element is located outside of the airbag as described in the foregoing embodiment.

In the alternative embodiment, moreover, since the exhaust hole 27A of the airbag 21A is comprised of the slit 65 so that the region 66 surrounded by the slit 65 acts as the first flap 66 of the flap body 69, less base material is required for manufacturing the flap body 69 compared with the flap element 45 of the foregoing embodiment.

Figure 19:
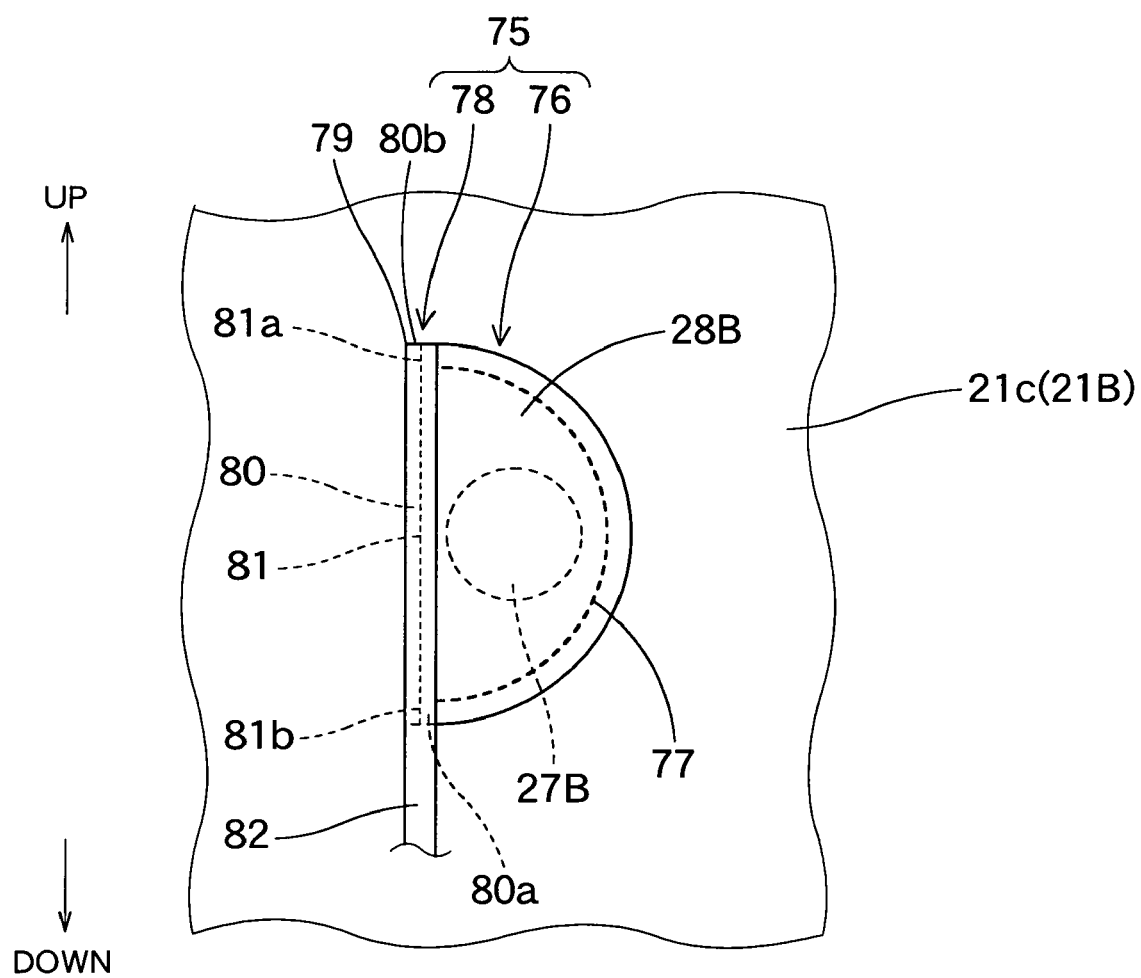
FIG. 19 is a schematic plan view of yet another modification of the flap element.
Figure 20:
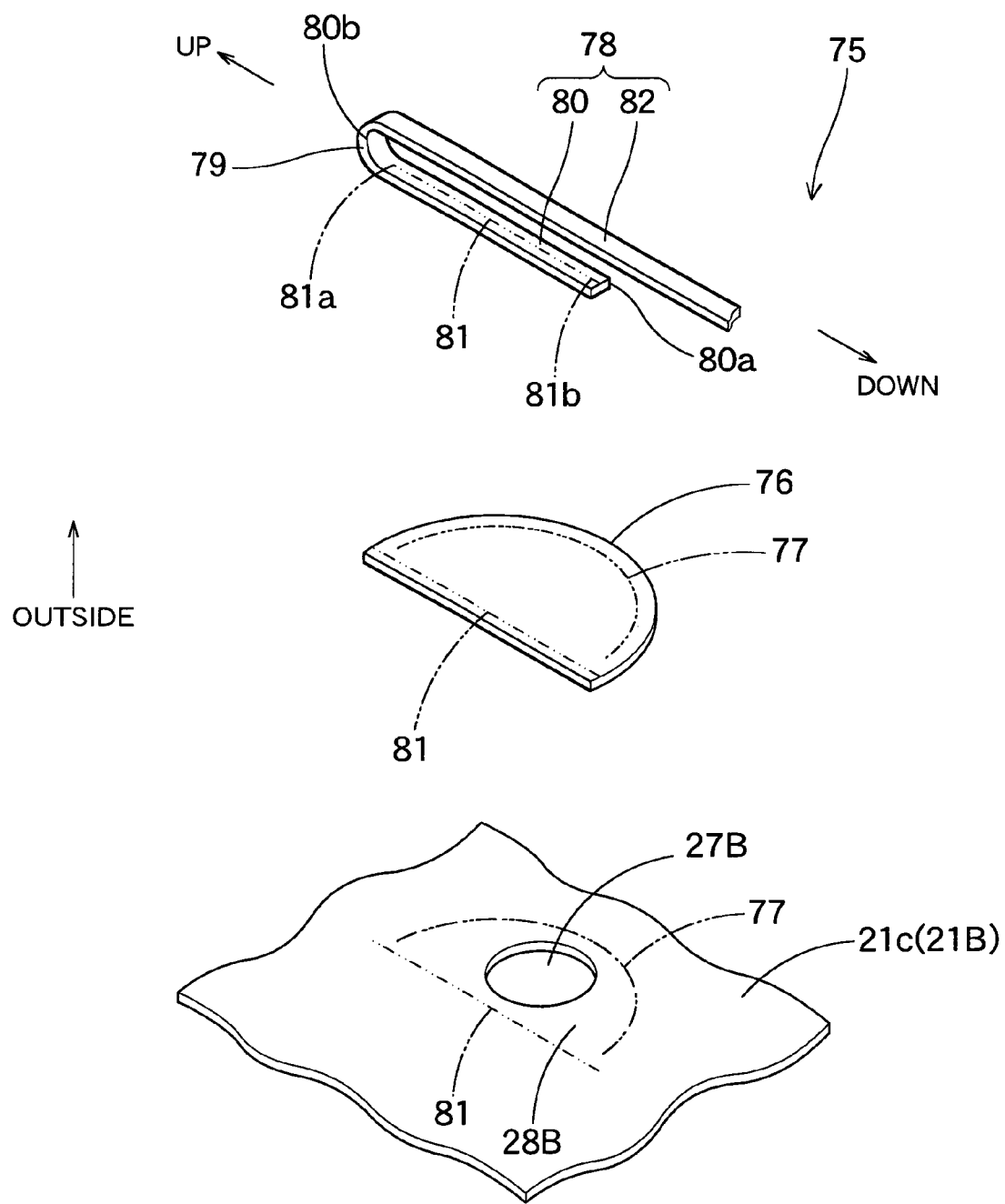
FIG. 20 is a schematic exploded perspective view illustrating the flap element of FIG. 19, an exhaust hole and its vicinity.

Although the flap element 45/68 includes three flaps for the flap body 46/69, the number of flaps should not be limited thereby, but may be two or four and above. Alternatively, the flap body may be comprised of a single flap as a flap element 75 shown in FIGS. 19 and 20.

The flap element 75 is disposed on the outside of the airbag 21B and includes a single flap 76 joined to the peripheral area 28B of the exhaust hole 27B having a generally circular contour and an adjusting belt 78 disposed to overlap with the flap 76.

The flap 76 is formed into a generally semi-circular contour capable of covering the peripheral area 28B as well as closing off the whole exhaust hole 27B. It is sewn to the peripheral area 28B of the exhaust hole 27B by a sewn seam 77 of sewing thread T1 that runs along a semi-arcuate hem thereof except a straight hem on which a later-described joint portion 80 of an adjusting belt 78 is located.

The adjusting belt 78 is joined to the anchor mechanism at a not-shown root of a traction portion 82 and joined to the flap 76 at its leading end 78a region. The leading end 78a region is folded back and acts as the joint portion 80. The leading end 80a of the joint portion 80 is located on the lower side relatively close to the anchor mechanism while the root portion 80b proximate the turn-round point 79 is located on the upper side facing away from the anchor mechanism. The belt 78 is configured such that its length direction conforms to that of the traction portion 82. The joint portion 80 is sewn to the flap 76 and peripheral area 28B of the exhaust hole 27B by a sewn seam 81 of sewing thread T2. That is, the seam 81 is configured such that the first terminal 81a i.e., a terminal on the part of the root 80b or the turn-round point 79 is located on the upper side facing away from the anchor mechanism upon airbag inflation relative to the second terminal 81b on the part of the leading end 80a. The flap 76 is sewn to the peripheral area 28B of the exhaust hole 27B along the entire hem by the sewn seams 77 and 81.

In the flap element 75, too, the sewn seam 81 that sews the joint portion 80 of the adjusting belt 78 to the flap 76 is formed generally straightly and such that the first terminal 81a on the part of the root end 80b from which the seam 81 starts to rupture is located on the upper side facing away from the anchor mechanism relative to the second end 81b on the part of the leading end 80a. This configuration helps concentrate the traction force of the flap 76 on the first terminal 81a when the airbag 21B inflates in a condition where the adjusting belt 78 is anchored by the anchor mechanism, so that the sewing threads T2 of the sewn seam 81 will tear out stitch by stitch smoothly from the first terminal 81a to the second terminal 81b. When the seam 81 tears out, the inflation gas G pushes up the flap 76 and is released from a gap provided between the flap 76 and peripheral area 28B of the exhaust hole 27B. Hence the flap element 75 opens smoothly to open up the exhaust hole 27B promptly with the structure of this embodiment. In addition, since the entire hem of the flap 76 is sewn to the peripheral area 28B of the exhaust hole 27B by the sewn seams 77 and 81, gas leakage from the exhaust hole 27B is inhibited as much as possible when the airbag 21B inflates with the adjusting belt 78 released from the anchor mechanism.

Figure 21:
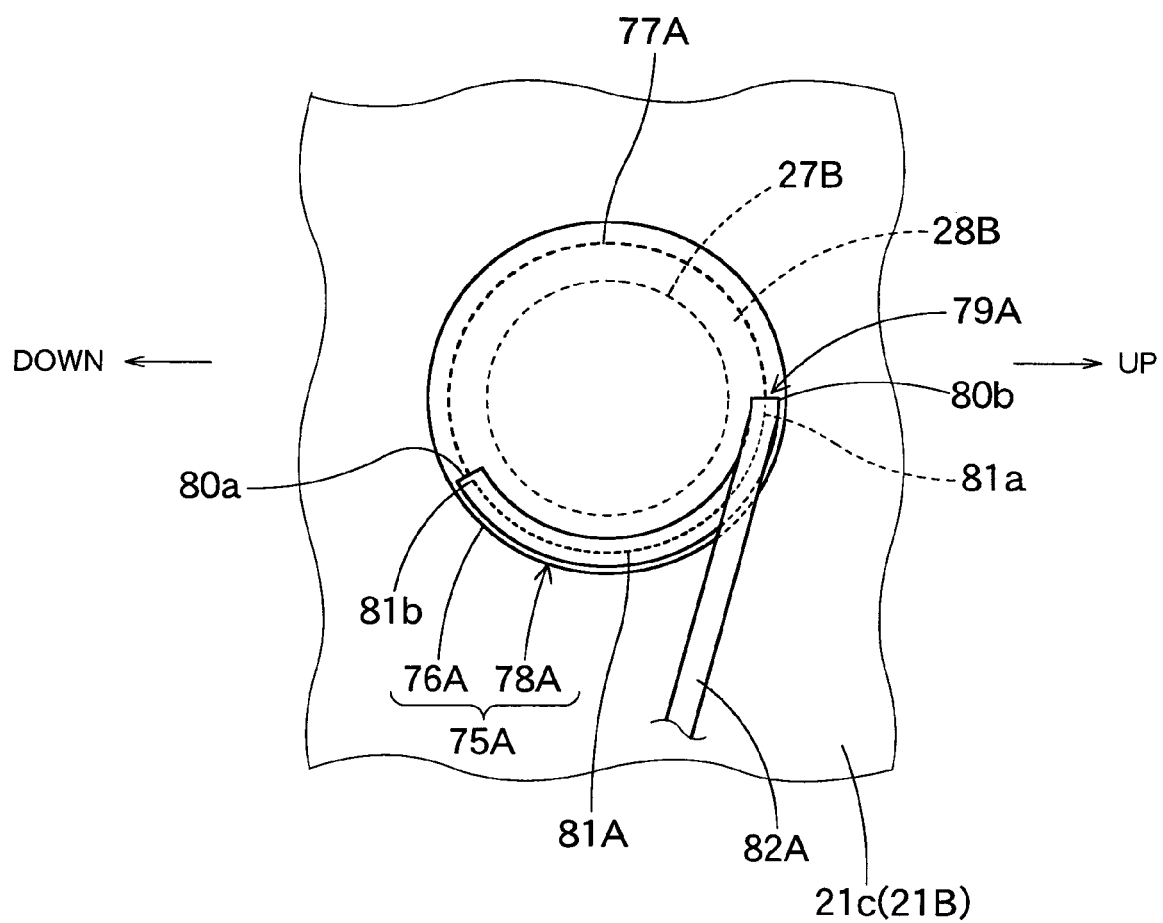
FIG. 21 is a schematic plan view of still another modification of the flap element.
Figure 22:
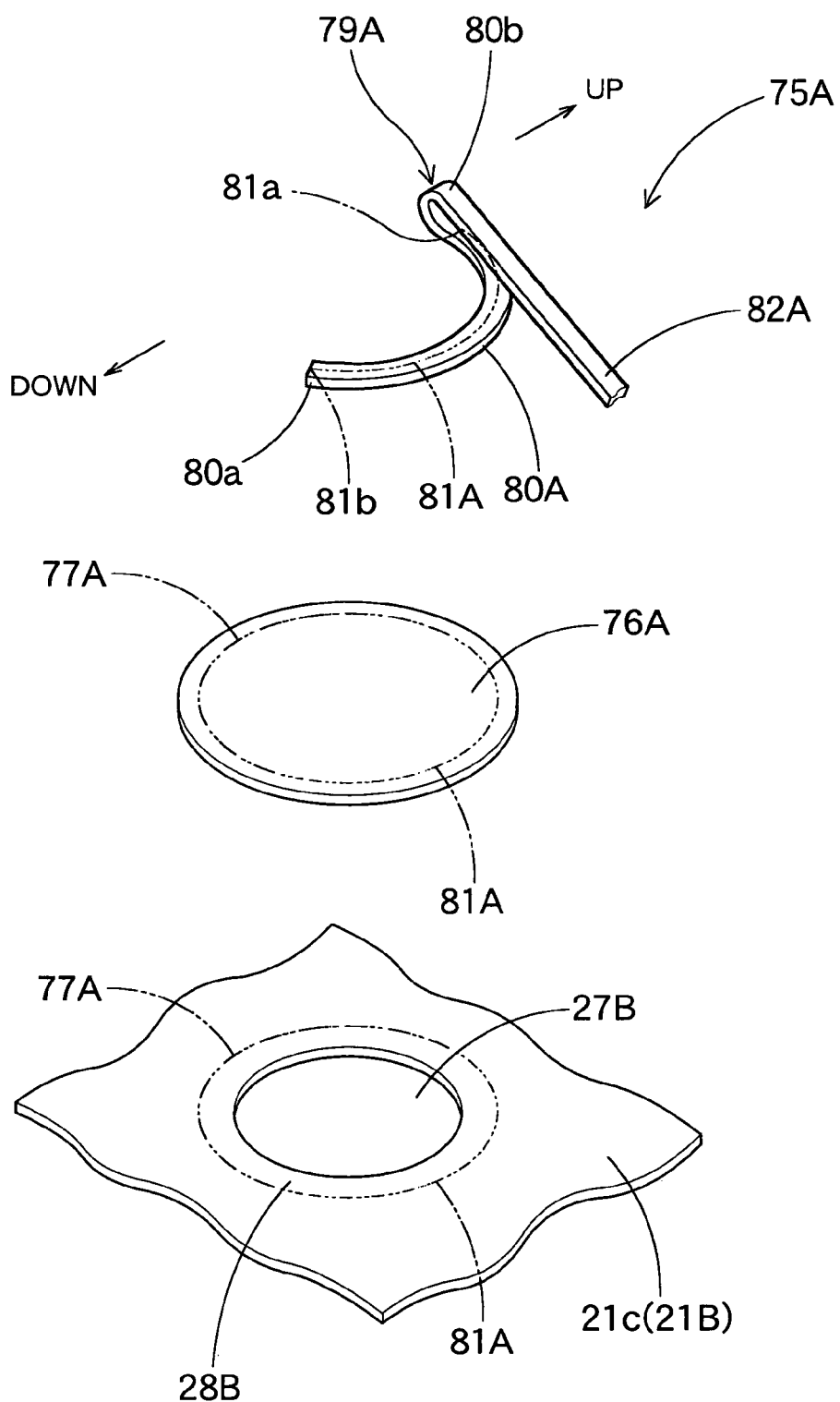
FIG. 22 is a schematic exploded perspective view illustrating the flap element of FIG. 21, an exhaust hole and its vicinity.

The straightness of the sewn seam is not imperative as long as the sewing thread T2 smoothly ruptures from the first terminal 81a. In yet another alternative embodiment shown in FIGS. 21 and 22, a flap element 75A includes a generally circular flap 76A for closing off an exhaust hole 27B and an adjusting belt 78A whose joint region 80A and sewn seam 81A are curved in a third arcuate fashion approximate a straight line. The joint portion 80A of the adjusting belt 78A is disposed on a hem of the flap 76A such that the leading end 80a is located on the lower side while the root portion 80b proximate the turn-round point 79A is located on the upper side. The traction portion 82A is arranged along the tangential line at the vicinity of the turn-round point 79a of the belt 78A. That is, upon airbag inflation, the first terminal 81a of the sewn seam 81A i.e., the terminal on the part of the root 80b is located facing away from the anchor mechanism relative to the second terminal 81b on the part of the leading end 80a, and the sewn seam 81A is disposed along the tractional direction by the traction portion 82A. This configuration helps concentrate the traction force on the first terminal 81a upon airbag inflation, so that the sewing threads T2 of the sewn seam 81A will tear out stitch by stitch smoothly from the first terminal 81a to the second terminal 81b to open up the exhaust hole 27B even with the curved seam 81A.

Figure 23A:
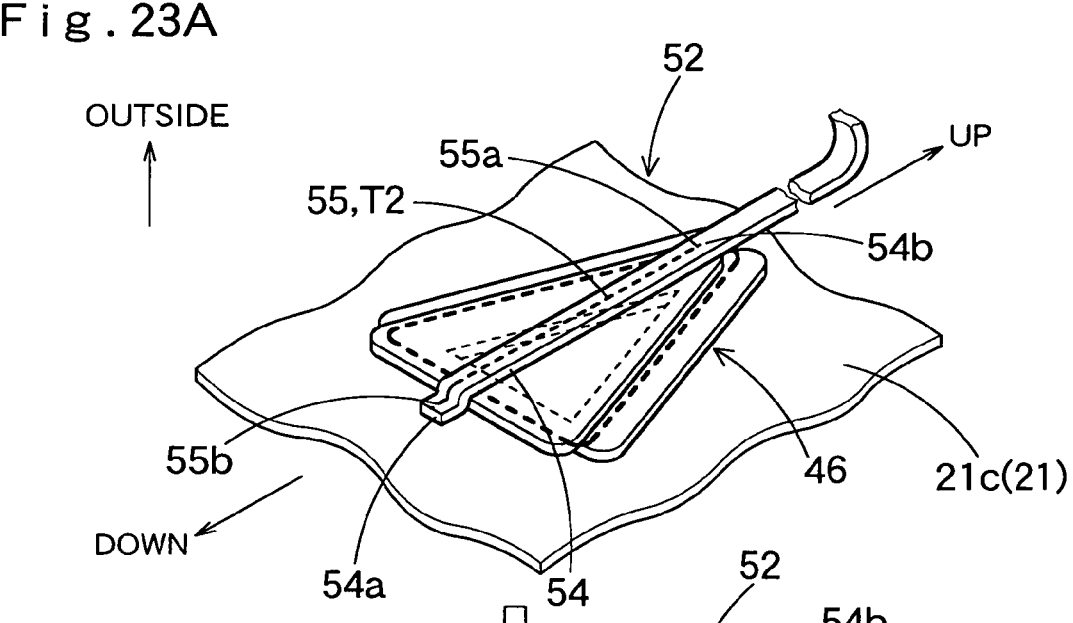
FIGS. 23A, 23B and 23C schematically illustrate a process that the joint portion of the flap element of FIG. 9 is separated from the flap body in the instance where the adjusting belt is not folded back at the vicinity of the root of the joint portion when housed.
Figure 23B:
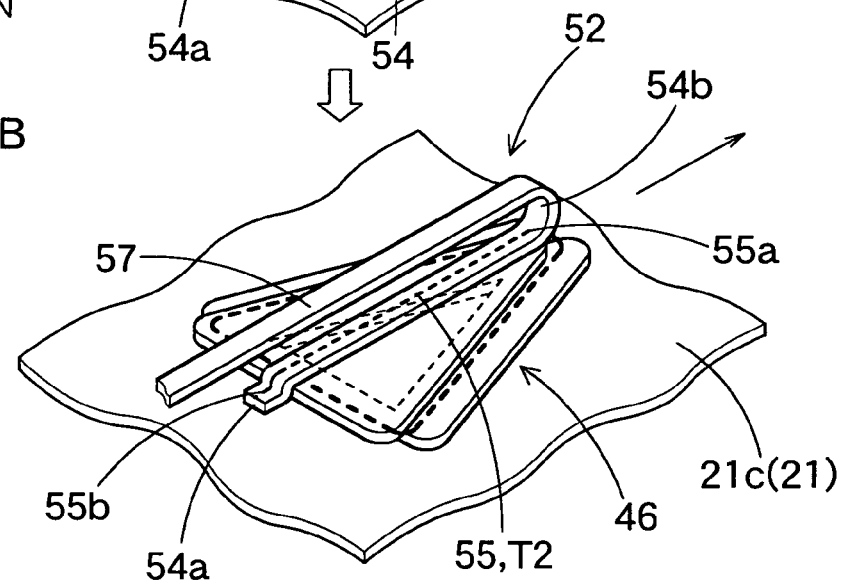
Figure 23C:
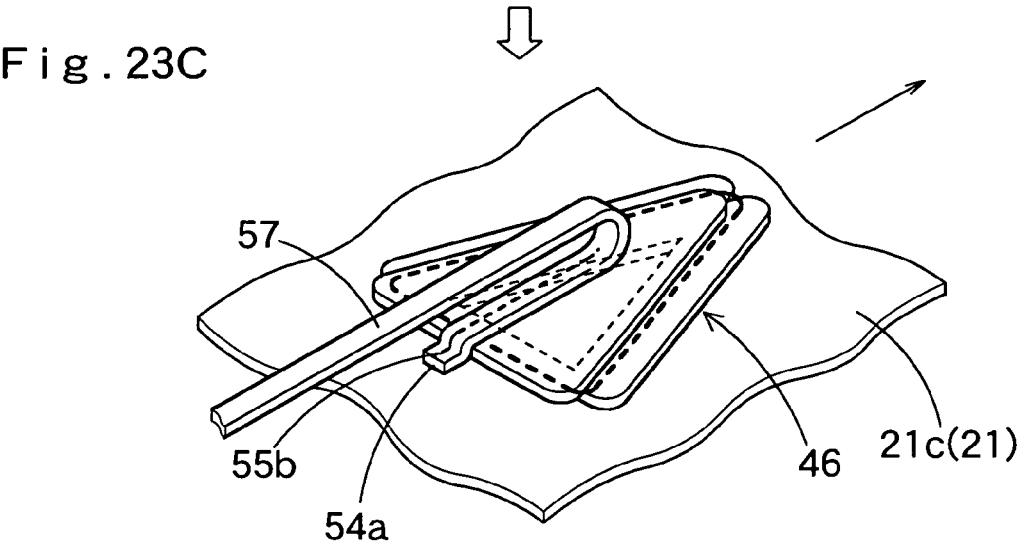

In the foregoing embodiments, the adjusting belt 52/52A/78/78A is folded up and housed together with the airbag 21/21A/21B/21C in a folded-back state at the turn-round point 53/53A/79/79A, i.e. at the vicinity of the root end 54b/80b of the joint portion 54/54A/80/80A. However, the adjusting belt does not necessarily have to be so configured as long as the first terminal of the sewn seam that sews the joint portion of the adjusting belt to the flap body, i.e. the terminal proximate the root end of the joint portion, is located away from the anchor mechanism relative to the second terminal proximate the leading end of the joint portion upon airbag inflation. By way of example, even if the airbag 21 is housed with the adjusting belt 52 not folded back at the vicinity of the root end 54b of the joint portion 54 as shown in FIG. 23A, when the airbag 21 inflates with the adjusting belt 52 anchored by the anchor mechanism 10, the flap body 46 lifts away from the anchor mechanism 10 along with airbag inflation and then the adjusting belt 52 bends at the vicinity of the root end 54b of the joint portion 54 as shown in FIG. 23B and is pulled and straightens the traction portion 57. Consequently, the sewing thread T2 of the sewn seam 55 starts to tear out from the first terminal 55a proximate the root end 54b of the joint portion 54 as shown in FIG. 23C.

What is claimed is:

1. An airbag apparatus comprising:
    an airbag inflatable with inflation gas from a folded and housed state and provided with an exhaust hole for releasing part of inflation gas;
    an open/close mechanism that controls opening and closing of the exhaust hole; and
    a flap element joined to a periphery of the exhaust hole of the airbag and connected with the open/close mechanism for openably closing the exhaust hole, the flap element being foldable together with the airbag and including:
        a flap that is configured of flexible sheet material and joined to the periphery of the exhaust hole for openably closing off the exhaust hole; and
        a flexible adjusting belt releasably joined to the open/close mechanism at a root region thereof and sewn to the flap in an overlapping fashion by a sewn seam at a leading end region thereof that acts as a joint portion to the flap, wherein:
    the sewn seam extends generally straightly from a root end toward a leading end of the joint portion and is configured such that a first terminal of the sewn seam disposed on the part of the root end of the joint portion is located farther away from the open/close mechanism relative to a second terminal disposed on the part of the leading end of the joint portion upon airbag inflation; and the sewn seam is configured to keep joining the joint portion of the adjusting belt and the flap such that the exhaust hole remains closed when the airbag inflates with the adjusting belt released from the open/close mechanism and is configured to tear out from the first terminal by breakage of sewing thread to separate the joint portion from the flap and allow the flap to uncover the exhaust hole when the airbag inflates with the adjusting belt engaged with the open/close mechanism.

2. The airbag apparatus of claim 1, wherein the flap element includes a plurality of the flaps that are superimposed one on another on a location to close off the exhaust hole and sewn together with the joint portion of the adjusting belt by the sewn seam.

3. The airbag apparatus of claim 2, wherein the joint portion of the adjusting belt is arranged to overlap with an opening area of the exhaust hole.

4. The airbag apparatus of claim 3, wherein the joint portion of the adjusting belt is arranged to extend generally along a direction to which the adjusting belt is pulled by the flap when the airbag inflates with the adjusting belt engaged with the open/close mechanism.

5. The airbag apparatus of claim 3, wherein the sewn seam sews the joint portion of the adjusting belt to the periphery of the exhaust hole as well as to the flap at the vicinities of the first terminal and second terminal.

6. The airbag apparatus of claim 2, wherein the flaps are joined to the periphery of the exhaust hole in radial arrangement about the center of the exhaust hole.

7. The airbag apparatus of claim 6, wherein:
the exhaust hole is comprised of a slit formed on the airbag to have such a linear shape as to project at the center; and
one of the flaps is comprised of a region of a base cloth of the airbag surrounded by the slit.

8. The airbag apparatus of claim 1, wherein the flap element is located inside the airbag.

9. The airbag apparatus of claim 1, wherein the flap element is located on the outside of the airbag.

* * * * *